US008286195B2

(12) United States Patent
Finger et al.

(10) Patent No.: US 8,286,195 B2
(45) Date of Patent: Oct. 9, 2012

(54) CONTROLLING HARDWARE ACROSS TWO OR MORE SIMULTANEOUSLY RUNNING OPERATING SYSTEMS

(75) Inventors: Jay Finger, Kirkland, WA (US); Jeffrey Alan Davis, Snohomish, WA (US); Brian Douglas King, Carnation, WA (US); John A. Yovin, Woodinville, WA (US); Praful Prataprai Chavda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 11/982,259

(22) Filed: Oct. 31, 2007

(65) Prior Publication Data
US 2009/0113458 A1    Apr. 30, 2009

(51) Int. Cl.
G06F 3/00     (2006.01)
G06F 9/44     (2006.01)
G06F 9/46     (2006.01)
G06F 13/00    (2006.01)
(52) U.S. Cl. ...................................... 719/327
(58) Field of Classification Search .................. 719/327
See application file for complete search history.

(56) References Cited

U.S. PATENT DOCUMENTS

| 5,265,252 | A |   | 11/1993 | Rawson, III et al. |
| 5,297,262 | A |   | 3/1994  | Cox et al. |
| 5,414,851 | A |   | 5/1995  | Brice, Jr. et al. |
| 5,764,984 | A |   | 6/1998  | Loucks |
| 5,901,319 | A |   | 5/1999  | Hirst |
| 6,115,342 | A | * | 9/2000  | Kazuno et al. ............. 369/59.26 |
| 6,351,782 | B1 |  | 2/2002  | Eaves |
| 6,393,495 | B1 |  | 5/2002  | Flory et al. |
| 6,606,669 | B1 |  | 8/2003  | Nakagiri |
| 6,681,216 | B2 |  | 1/2004  | Hewitt |
| 6,892,261 | B2 | * | 5/2005 | Ohno et al. .................... 710/260 |
| 6,986,032 | B2 |  | 1/2006  | Qureshi et al. |
| 7,877,592 | B2 | * | 1/2011 | Sun et al. ...................... 713/100 |
| 7,913,251 | B2 | * | 3/2011 | Arndt ................................ 718/1 |
| 2003/0115443 | A1 | * | 6/2003 | Cepulis et al. .................... 713/2 |
| 2006/0133362 | A1 | * | 6/2006 | Stein et al. ..................... 370/360 |
| 2007/0033389 | A1 |  | 2/2007 | Shamia et al. |
| 2007/0061441 | A1 | * | 3/2007 | Landis et al. ................. 709/224 |

OTHER PUBLICATIONS

Fraser et al., "Safe Hardware Access with the Xen Virtual Machine Monitor," First Workshop on Operating System and Architectural Support for the On-Demand IT Infrastructure (OASIS), 10 pages, Oct. 2004.
LeVasseur et al., "Unmodified Device Driver Reuse and Improved System Dependability via Virtual Machines," USENIX Association, OSDI '04: 6th Symposium on Operating Systems Design and Implementation, pp. 17-30, 2004.

* cited by examiner

Primary Examiner — Emerson Puente
Assistant Examiner — Kimbleann Verdi
(74) Attorney, Agent, or Firm — Klarquist Sparkman, LLP

(57) ABSTRACT

A computing device has two or more software stacks, each stack simultaneously running a different operating system. Only one enabled operating system at a time has control of hardware resources of the computing device. Each disabled operating system has its device drivers disabled. The drivers may be disabled by stopping device driver messages to devices at a firmware layer unassociated with any operating system. The drivers may be disabled by having their associated operating system dynamically unload them when the operating system is disabled. In some instances, the drivers may be modified to include a "stop" control that tells the driver to stop communicating with its associated device, and a "resume" control that tells the driver to resume communication. When an operating system is disabled, the operating system may send a "stop" message to its device drivers. Drivers associated with messages passed between operating systems may remain enabled.

19 Claims, 18 Drawing Sheets

SWITCH OS'S Dynamic Unloading

SWITCH OS'S Dynamic Unloading

SOFTWARE FOR CONTROLLING
HARDWARE ACCESS ACROSS TWO OR
MORE SIMULTANEOUSLY RUNNING
OPERATING SYSTEMS 1880

CONTROLLING HARDWARE ACROSS TWO OR MORE SIMULTANEOUSLY RUNNING OPERATING SYSTEMS

BACKGROUND

As transistors get cheaper it is becoming easier to include multiple CPU cores on a single chip. This is even applicable to consumer electronics (CE) devices that attempt to integrate most or all system functionality onto a single chip. In CE devices, the cost of adding additional cores to a chip is often cheaper than the cost of software development to code the additional functionality given by the additional cores on a single chip. As a result, complicated media formats that have a software "stack," i.e., an integrated running system available for single operating system (OS), or few high-quality stacks available for a single operating system, may force the choices of operating systems onto a CE manufacturer—the CE manufacturer, in essence, must use the operating system associated with the media format.

For example, as of early 2007, the only credible navigation engines for the new HD DVD format for CE devices have been available from Microsoft on Windows CE, and the only credible navigation engines for the Blu Ray format for CE devices are available for the Linux operating system.

SUMMARY

The following detailed description presents a technique to allow multiple operating systems to be simultaneously run on a single computing device. The operating systems are each associated with a separate software stack having their own memory and central processing unit (CPU). The operating systems all run on their designated stack. One operating system at a time has access to the hardware resources (e.g., inputs and outputs) of the device. The operating system that has access to the hardware resources appears to be running the device, and is, thus enabled.

When there is a reason to switch to a different operating system (such as when media with a format preferably read by one operating system is detected), rather than rebooting to change operating systems, which can take significant time, the device drivers of the enabled operating system are disabled, and the device drivers of the already running and soon-to-be-enabled operating system are enabled. The newly-enabled operating system then has control of the device.

In one embodiment, device drivers of each operating system are routed through I/O services at a firmware level, the firmware unassociated with any specific operating system. When an operating system is disabled, its device driver messages are not passed by the firmware to the associated device. When an operating system is enabled, its device driver messages are passed by the firmware to the associated device.

In another embodiment, a currently-enabled operating system dynamically unloads its device drivers, and then passes a message to the soon-to-be-enabled operating system that it will be taking over. The new operating system then dynamically uploads its device drivers. Device drivers used to pass the message between operating systems may not be unloaded.

In yet another embodiment, device drivers of each operating system may be modified such that they have two new controls, a "stop" control that tells the device driver to cease communication with the associated device, and a "resume" control that tells the device driver to resume communication with its device. A currently-enabled operating system may then send "stop" messages to its associated device drivers, and then send a message to the soon-to-be-enabled operating system, telling it to turn its device drivers on. The soon-to-be-enabled operating system may then send "resume" messages to its associated device drivers. Device drivers used to pass the message between operating systems may not be "stopped."

Other embodiments incorporate elements of the three embodiments described above.

The foregoing and other objects, features, and advantages of the invention will become more apparent from the following detailed description, which proceeds with reference to the accompanying figures.

DETAILED DESCRIPTION

Overview

Figure 1:
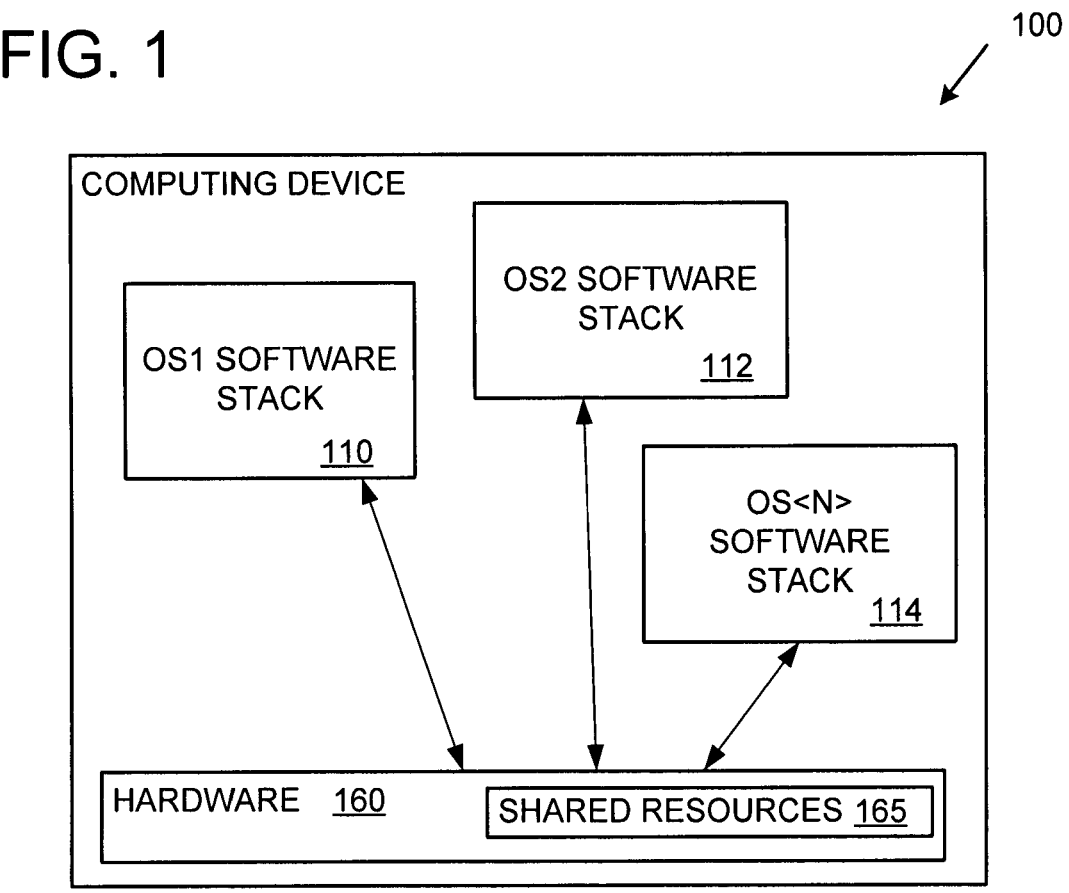
FIG. 1 is a block diagram of an exemplary system for controlling the hardware of two or more simultaneously running operating systems as taught herein.

The following description relates to techniques to automatically allow a single device to process information (such as media) in two or more otherwise incompatible formats. In one embodiment, the following description describes an example implementation of the technique in the context of a single optical disk player running the HD/DVD and the Blu-ray optical disk formats. For purposes of illustration, this exemplary optical disk player incorporating this technique is able to play disks with both the HD/DVD format and disks with the Blu-ray format. Alternatively, the technique also can be incorporated into a different sort of device in which media with two or more competing formats exist, such as music players with multiple digital audio data compression formats, such as some combination of MP3, Windows Media Audio, Ogg Vorbis, and/or Advanced Audio Coding. The technique does not require that the device be of a particular type. Rather, the technique can be applied to devices in which multiple data formats exist.

Example 1

Exemplary System for Controlling Hardware Across Two or More Simultaneously Running Operating Systems FIG. 100 shows an exemplary computing device system 100 for controlling hardware access across two or more simultaneously running operating systems. The computing device 100 may be any appropriate computing device, such as a personal computer, a media recorder/player, such as a videodisk recorder/player, a game machine, and so on. The computing device 100 has two or more software stacks OS1 110, OS2 112, (optional) OS3, etc (represented in FIG. 1, by OS<N> 114, where N=the number of software stacks greater than two present on the device 100), each software stack with its own central processing unit (CPU), each implementing an operating system. Each software stack can separately run the device and its associated hardware 160. The hardware includes resources 165 that are used by two or more of the software stacks 110, 112, 114

The operating system can be any operating system which can be used to run a computing device, such as, e.g., one from the Microsoft Windows family, such as Windows 98, Windows 2000, Windows Millennium Edition (ME), Windows Vista, Windows 7, Windows XP, a real-time operating system such as Windows CE, and so forth; Apple Operating systems such as Mac OS in its various incarnations; Linux operating systems; UNIX, and so forth. Both open source and closed source operating systems are envisioned to be used with any of the systems described herein. The operating systems may be real-time operating systems. Real-time operating systems are operating systems that allow multitasking intended for use in real-time applications. Examples of such applications include gaming controllers, mobile telephones, video players, hand-held computers, other embedded systems such as household appliance controllers, and the like.

Example 2

Figure 2:
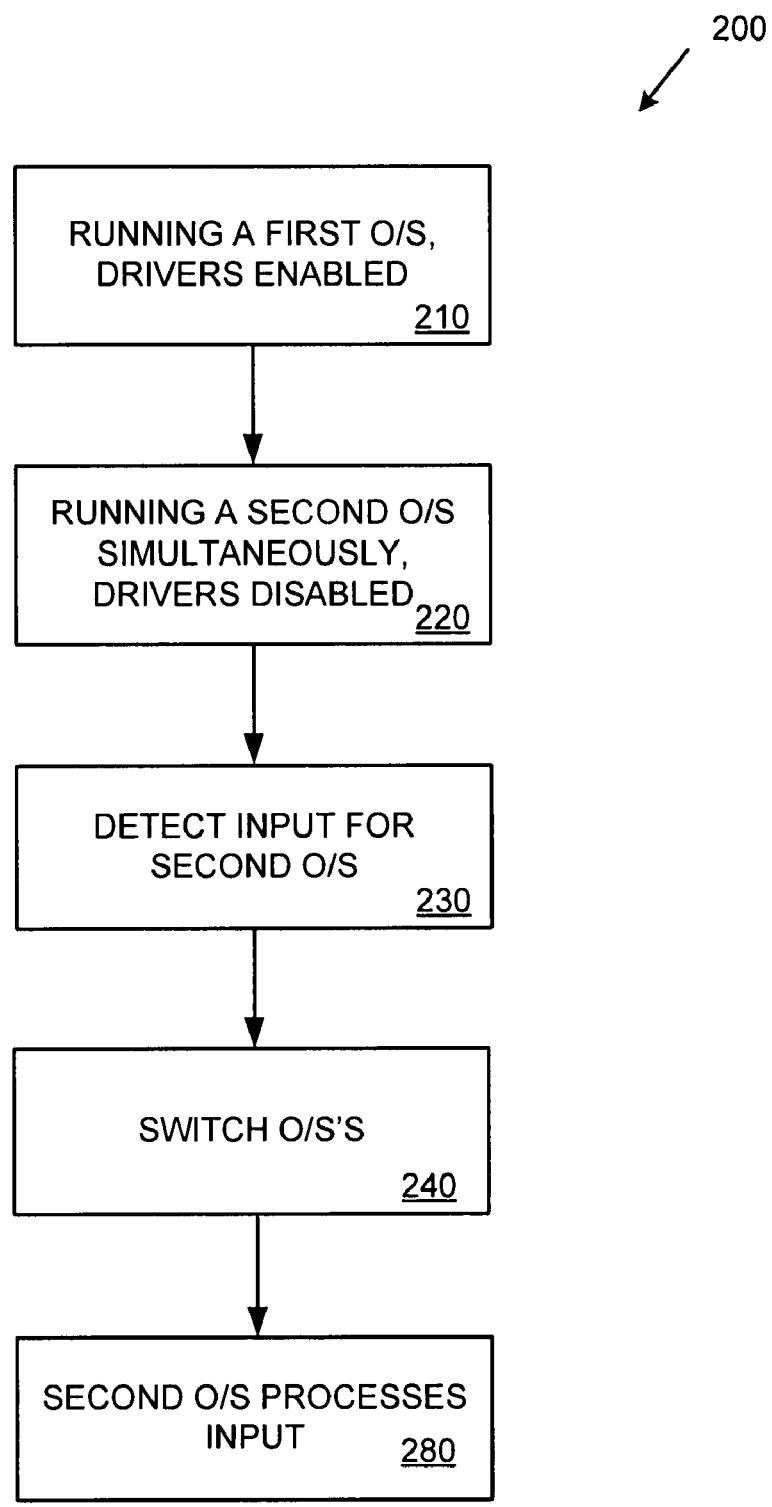
FIG. 2 is flowchart of an exemplary method for controlling the hardware of two or more simultaneously running operating systems as taught herein.

Exemplary Method for Controlling Hardware Across Two or More Simultaneously Running Operating Systems FIG. 2 shows an exemplary method 200 for controlling hardware access across two or more simultaneously running operating systems. The method can be performed, for example, by the system 100 of FIG. 1. The method 200 and any of the other methods described herein can be performed by computer-executable instructions stored on one or more computer-readable media.

Figure 4:
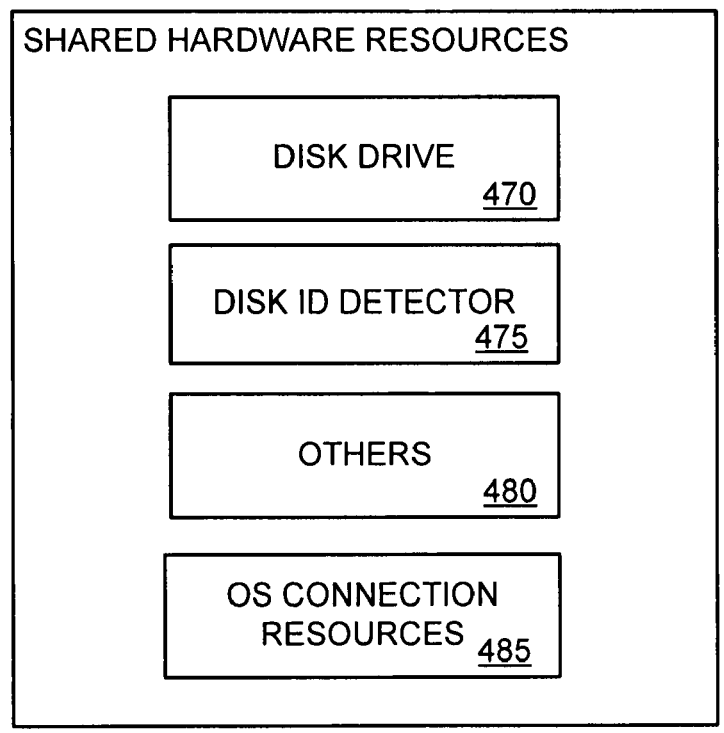
FIG. 4 is a block diagram illustrating exemplary hardware resources shared between two or more operating systems in an exemplary computing environment as taught herein.

When an application running on an operating system communicates with an outside device, such as the shared resource devices shown in FIG. 4, it communicates with the device using a driver written for the operating system in which the application runs. This operating system, through use of its enabled drivers, is able to monitor and respond to inputs from hardware resources. At 210 a first operating system (e.g., an operating system which is part of a software stack 110 of FIG. 1) is run. At 220, a second operating system (e.g., associated with the software stack 112 of FIG. 1) is run simultaneously with the first operating system. The second operating system, as part of its startup, has a portion of its device drivers disabled, such that the second operating system is isolated from communicating with some or all of the hardware devices 160 of the computing device 100. In some embodiments, drivers are disabled which are used by the second operating system to communicate with device hardware 165 (FIG. 1) shared with the first operating system. A minimal set of second operating system drivers (e.g., communication drivers) may be enabled to inform the second operating system when it is to be enabled (e.g., communicate with the shared resources 165 of FIG. 1) to allow the second operating system to restore its drivers to functionality.

Different operating systems sometimes accept input in different formats and have different strengths and weaknesses. For example, certain games are written to run on a specific operating system, e.g., Amiga, Nintendo, Sony playstation, Wii, Xbox, Xbox3, Playstation, Playstation 360, and so forth. As an example, when a gaming computing device detects a game of a certain format, an appropriate operating system (currently running) may have its drivers enabled such that that specific operating system may control game play.

At 230, an input that is better understood by the second operating system is detected. The detecting can be done by the currently-running operating system using enabled drivers, a firmware layer poised between the hardware and the software stack of the first operating system or another method that intercepts the message from a hardware device.

At 240, the operating systems are switched 240; the second operating system 280's drivers are enabled, such that the second operating system can read the input from a hardware device associated with the computing device 100 (FIG. 1) and then process the detected input 280.

Example 3

Exemplary Software Stack

Figure 3:
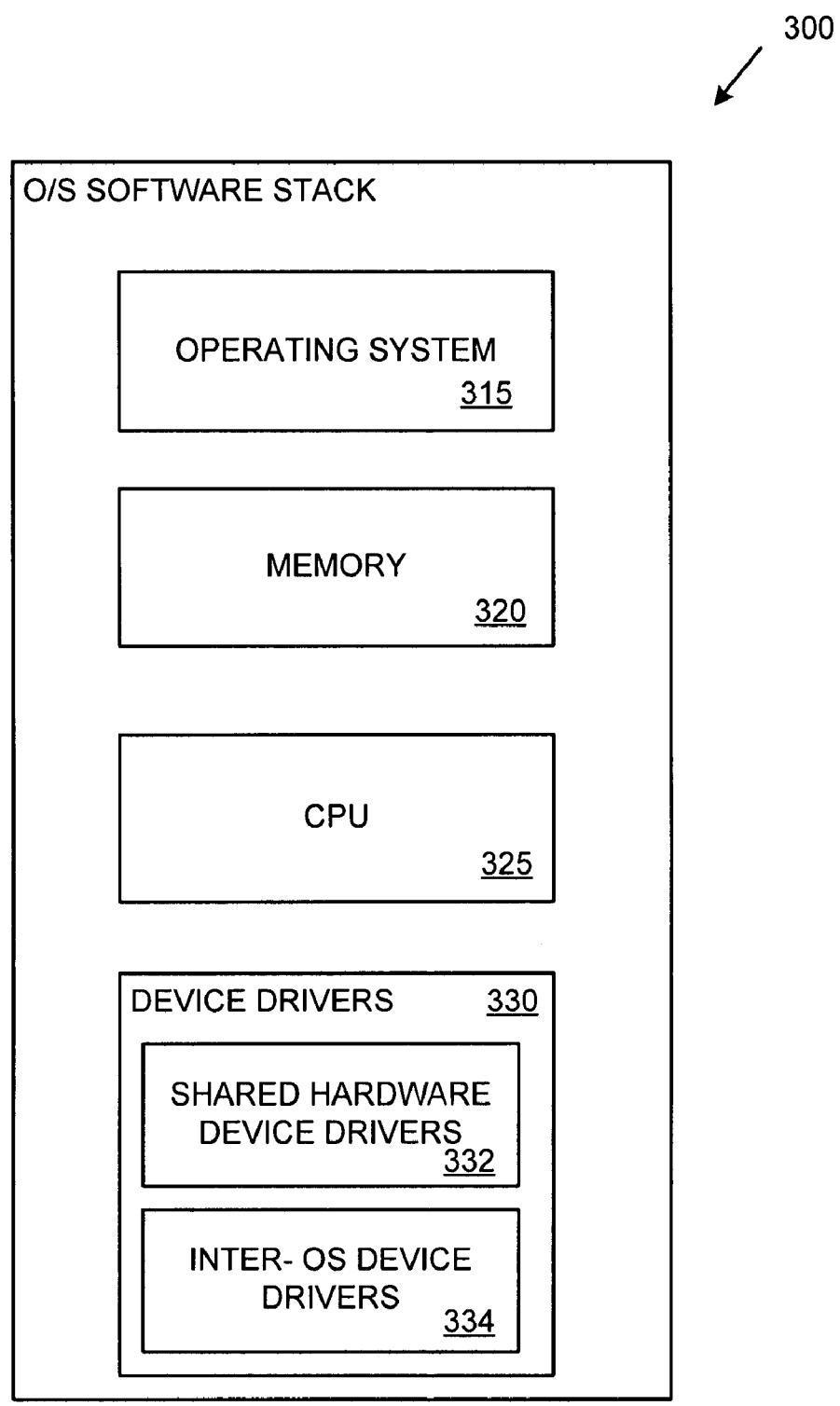
FIG. 3 is a block diagram illustrating an exemplary software stack as taught herein.

FIG. 3 shows an exemplary software stack 300 that can be used in a system, e.g., the computing device of FIG. 1. A software stack is a functional system, including an operating system with associated memory and CPU, that can run a computing device, including running all hardware devices, through, e.g., device drivers, associated with the computing device. Software stacks are sometimes called solution stacks. Software stacks may be burned in their entirety onto a single chip. Multiple software stacks may be present on a single chip, as well. The software stack 300, in its entirety or in part, may be used with embodiments, e.g., the computing device 100, disclosed herein. The software stack 300 has code to run an operating system 315. The operating system may be any operating system that can be used to run a computing device.

The software stack also may have a memory 320 used when running the operating system 315. This memory 320 may hold the operating system (or a portion thereof) as it is executing, may hold loaded drivers, and so on. A central processing unit (CPU) 325 dedicated to running the operating system 315, may also be included.

Device drivers 330, specific to the operating system 315 may also be a part of the software stack 310 to communicate with e.g., hardware 160 and shared resources 165 of a computing device, e.g., the computing device 100. Generally, device drivers are specific to a given operating system, such that when a system, such as the computing device system 100, has multiple operating systems, each operating system has its own set of device drivers to interface with the various available hardware devices 160, 165, and optionally, inter-operating system communication drivers. Device drivers used to communicate with hardware accessed by multiple simultaneously running operating systems 332 may be included. Optionally, device drivers used for communication between operating systems 334 may also be included. Such device drivers would be used, for example, for the first operating system 110 to pass control to the second operating system 112.

Example 4

Exemplary Shared Hardware Resources

FIG. 4 is a block diagram illustrating exemplary hardware resources 400 shared between two or more operating systems in an exemplary computing environment as taught herein. Such resources will have device drivers belonging to one operating system controlling them when that operating system is enabled, and will have device drivers belonging to a second operating system controlling them when control passes to the second operating system. Examples of such resources follow.

A computing device (e.g., the computing device 100) may have, as shared hardware, a disk drive 470. The disk drive 470 may be an optical disk drive that accepts more than one format optical disk. For example, the disk drive could accept both HD DVD disks and Blu-ray disks. The disk drive could also accept CD-ROMS, CD's, and so on. A Disk ID detector 475, which can read the type of disk (e.g., a specific format such as CD ROM, HD DVD, Blu-ray, etc) may also be included. This disk ID detector may be accessed by an operating system, or may be accessed outside of any running operating system, such as by a firmware layer. Such a Disk ID detector 475 may be implemented as a state machine.

Other shared hardware resources 480, not specifically mentioned, are also envisioned to be included. Resources which allow the different operating systems to pass messages between them 485, e.g., messages between an operating system whose device drivers are enabled and another operating system that is running on its software stack but whose device drivers (or at least the bulk thereof) are disabled, may also be included. These resources may be controlled by, e.g., inter-os device drivers 334 (FIG. 3.)

Example 5

Exemplary System with Two Types of Disk Input

Figure 5:
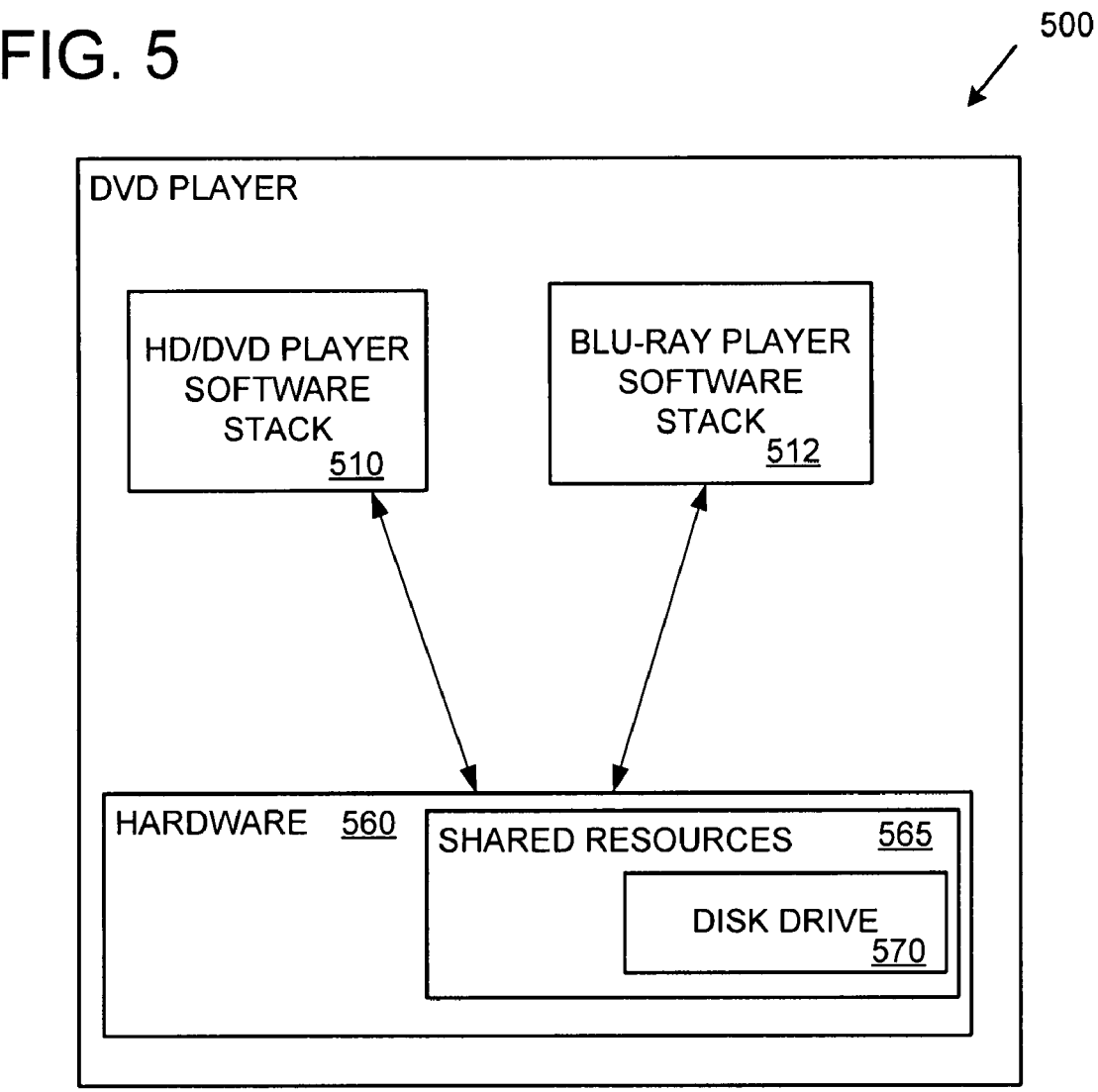
FIG. 5 is a block diagram of an exemplary system for controlling the hardware of two or more simultaneously running operating systems which uses one operating system to process one type of disk input and another operating system to process another type of disk input as taught herein.

FIG. 5 is a block diagram of an exemplary system 500 for controlling the hardware of two or more simultaneously running operating systems which uses one operating system to process one type of disk input and another operating system to process another type of disk input.

The system 500 may be a DVD player or game player 500 with two associated software stacks 510, 512. In this example, an exemplary DVD/game player has an HD DVD player software stack (e.g., the software stack 400) which may run Windows CE, and a Blu-ray software stack (e.g., the software stack 400) which may run Linux. Microsoft's Xbox 360 is a DVD player, Sony's Playstation 3 is a Blu-ray player.

A disk drive 570 may also be included. This disk drive may have, either as part of the disk drive, or associated with the hardware 560, a disk id detector (e.g., 475 of FIG. 4) to determine which format disk (e.g., HD DVD, Blu-ray, or some other format) is currently in the player. The DVD player/game player may also have hardware devices 560 including hardware devices 565 used by both operating systems. The hardware may also have a way of telling (e.g., device drivers 330 of FIG. 3) both the running operating system (associated with a software stack) whose device drivers are enabled and the operating system whose device drivers are disabled which format disk is being run. In such a case, when an operating system has its device drivers disabled, one or more drivers are left enabled that are used to let the operating system know when it is to enable its device drivers.

A company interested in delivering a product that uses both the HD DVD format and the Blu-ray format (such as a video player or a game player) may, rather than implementing HD DVD on Linux or implementing Blu-ray on Windows (or some other operating system) may instead choose to build a device, such as the device 500, that runs multiple operating systems, for example, Windows CE and Linux.

Example 6

Figure 6:
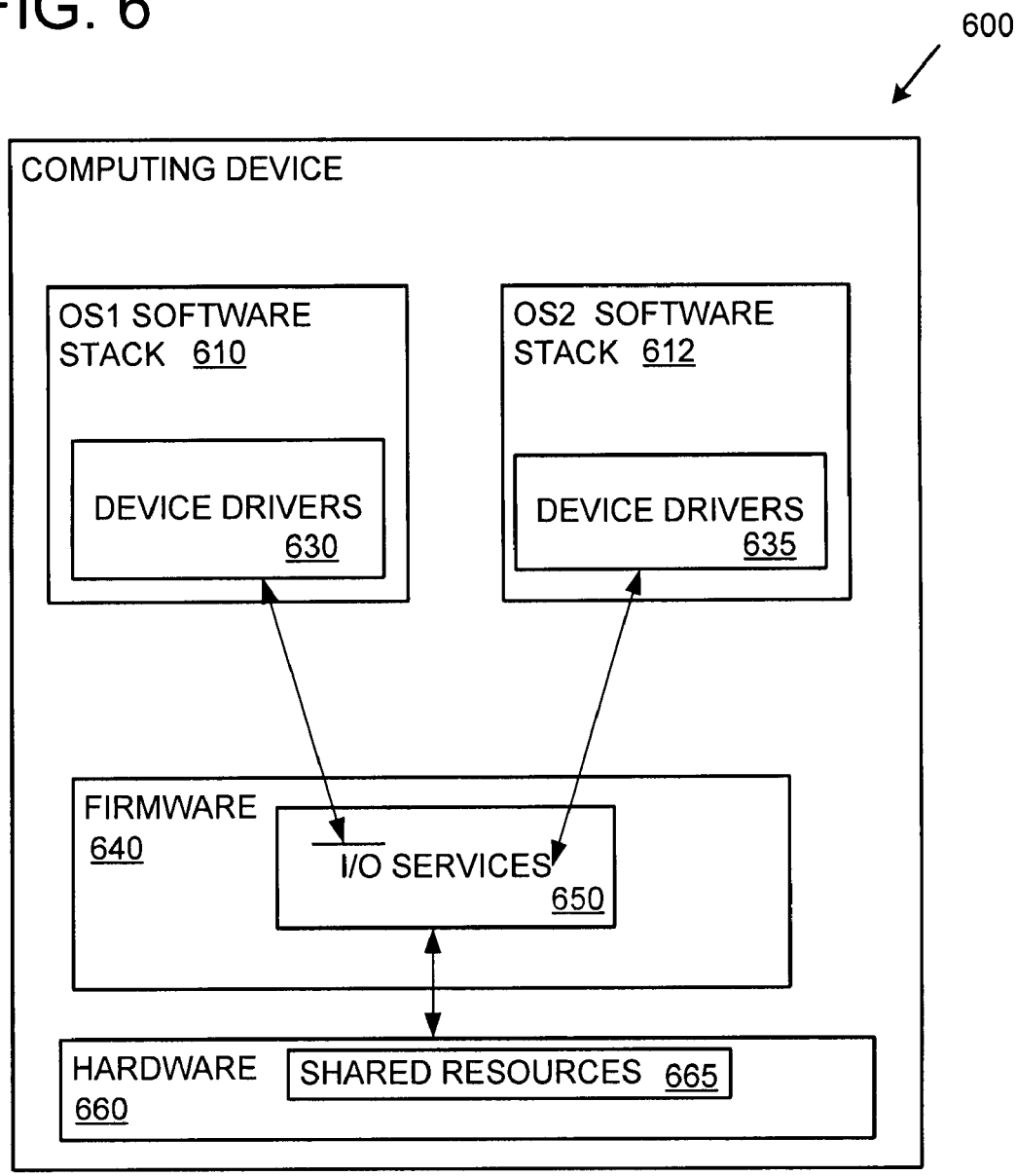
FIG. 6 is a block diagram of an exemplary system with a firmware layer which selectively enables a single running operating system's drivers and disables other running operating system's drivers.

Exemplary System with a Firmware Layer that Selectively Enables a Single Enabled Operating System Device Driver Messages FIG. 6 is a block diagram of an exemplary system 600 with a firmware layer which selectively enables a single running operating system's drivers and disables other running operating system's drivers. A first operating system running on a software stack 610 has associated device drivers 630 which may communicate with hardware resources 665 accessed by both the first and second operating system. A second operating system running on a software stack 612 has associated device drivers 635 which also may communicate with hardware resources 665 accessed by both the first and second operating system. The device drivers 630, 635 (or, in some embodiments, some of the device drivers 630, 635) do not communicate directly with the shared resources 665, but rather communicate with a firmware layer 640 unaffiliated with either operating system instead.

Firmware 640 may be a software program usually embedded in a hardware device. It is sometimes used to control the specific hardware device in which it is embedded. Other firmware 640 is used at the system level, such as a BIOS used to boot a device on startup. Firmware 640 can stay resident in a computer memory. Here, in an exemplary embodiment, the firmware 640 is loaded when the system (e.g., the system 100) is turned on and is unaffected by which operating system is currently enabled (e.g., has its drivers enabled to talk to the hardware). The firmware 640 then determines which messages to pass to the shared resources.

In some embodiments, the firmware may have a routine or series of routines—I/O services 650—that allow a single point of entry for device drivers that access shared resources 665. In some embodiments, the I/O services 650 are rudimentary but allow specific drivers to be ported without sacrificing much performance, or without incurring too many fundamental changes.

Drivers (such as device drivers 330, 335) associated with software stacks (such as the stacks 610, 612), are very operating system specific. Even operating systems created by the same company are probably not compatible. However, drivers of a given operating system may have a common interface. In some systems, drivers may fall into different groups, with each group sharing a common interface. For example, in Windows CE, most drivers fall into four categories: native drivers, stream interface drivers, USB drivers, and NDIS drivers. Each category of driver is accessed in a slightly different way. For example, the stream interface drivers share a common interface, the stream interface; the native drivers share a different common interface, DDI; while the NDIS drivers and the USB drivers have much more idiosyncratic interfaces. However, most if not all of these Windows drivers rely on a layer of code—the module device driver—that can be used across platforms. The module device drive doesn't access the hardware 660 or the shared hardware resources 665 directly, but instead relies on a different code layer, the platform dependent layer, to do so. This platform dependent layer can be modified such that the device drivers all are routed through the firmware I/O services 650. The I/O services may be implemented using simple I/O control (IOCTL) read/write/open/close semantics. Other operating systems may have similar layers that device drivers are routed through prior to reaching an actual device. In such systems the low level layer may be rewritten to force device driver messages through a firmware layer 640.

The device drivers 630, 635, at various layers, such as, e.g., a the platform dependent layer; a module device driver, and/or an at the application level, may be given an indication of the operating system from which they originate. The firmware 640 may have process such as, e.g., a disk read state machine, that indicates when a certain operating system should be enabled. For example if a disk of a specific format preferably processed by a first operating system (e.g., a HD DVD disk and a Windows CE operating system) is detected by the firmware, the firmware may then indicate to the I/O services 650 to ignore all messages from device drivers associated with the other running operating systems and to send the messages from the designated operating system to the associated hardware devices. Similarly, the firmware layer would then route messages from hardware devices to device drivers of the enabled system, if necessary.

This enables (i.e., turns on) the designated operating system, as it can now process disk and any other inputs from the system 600. The undesignated operating systems, while still running, are effectively disabled, as they no longer interact with the hardware 660, 665 of the system 600. Further, the turnover from one system to another may happen very quickly. A prior art method of operating a device with multiple operating systems, i.e., rebooting, takes considerably longer.

In other implementations, multiple I/O services 650, e.g., one for each interface, are present. Each operating system then would modify its device drivers to be routed through designated I/O service 650. The firmware would then signal to the I/O service associated with the enabled operating system to pass on its messages, while the other I/O services would be signaled to block their device driver messages from reaching their designated hardware.

Example 7

Figure 7:
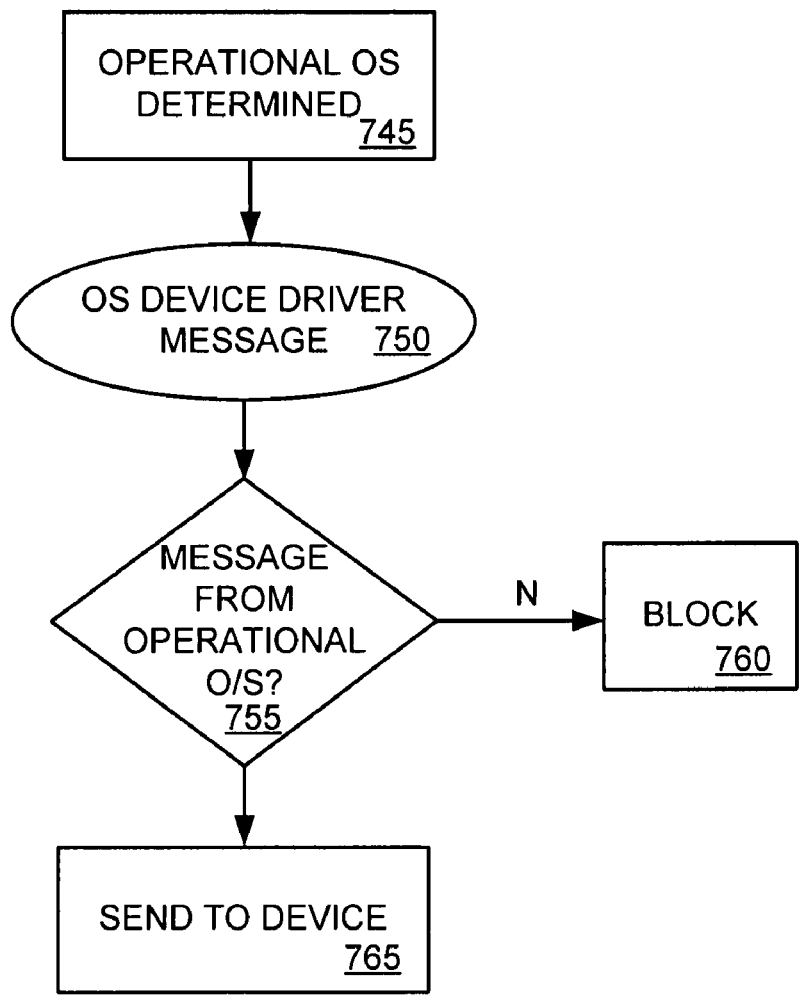
FIG. 7 is flowchart of an exemplary method for controlling the hardware of two or more simultaneously running operating systems at a firmware level as taught herein.

Exemplary Method for Controlling the Hardware of Two or More Simultaneously Running Operating Systems at a Firmware Level FIG. 7 is flowchart 700 of an exemplary method for controlling the hardware of two or more simultaneously running operating systems at a firmware level. The method can be performed, for example, by the system 600 of FIG. 6. At 745, the operating system that should be running (the designated operating system) is determined. This may be done, e.g., by a firmware level determining that an input has been detected that preferably should be processed by one of the running operating systems (e.g., 110, 112, 114 of FIG. 1.) At 750, an operating system device driver message is intercepted (or received at a firmware level, e.g., 640 at FIG. 6). At decision block 755, it is determined if the message is from the designated operating system. If not, control flow passes to 760. If so, control flow passes to 765. At 760, the message is blocked. In some embodiments the message is discarded. In other embodiments, the message is checked for content that is to be delivered even when from a non-designated operating system. At 765, the message is sent to the hardware device.

In some systems, messages from devices are also captured by a firmware layer and then routed to the designated operating system.

Example 8

Figure 8:
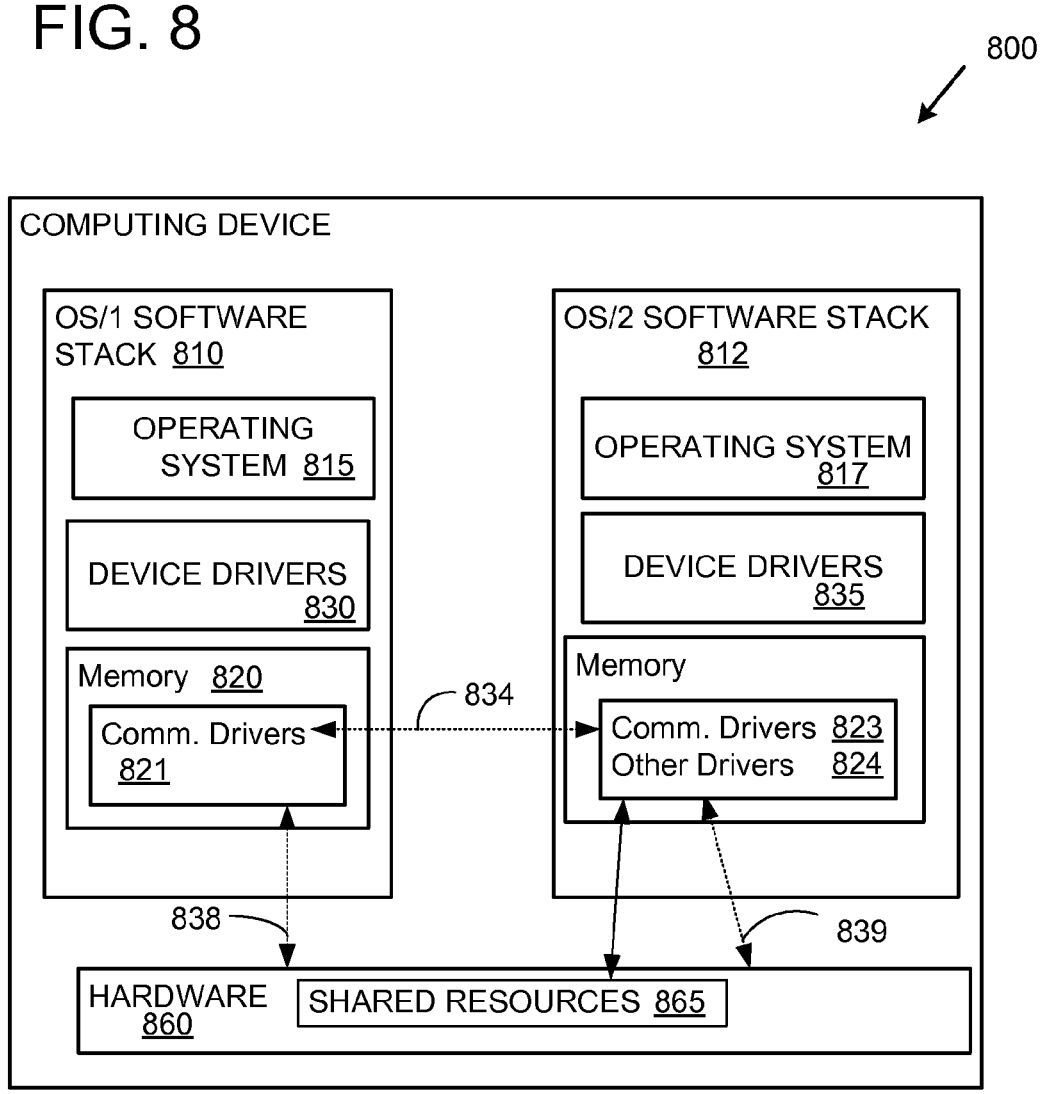
FIG. 8 is a block diagram of an exemplary system which dynamically unloads a single running operating system's drivers and dynamically loads another operating system's drivers.

Exemplary System which Dynamically Unloads a Single Running Operating System's Drivers and Dynamically Loads Another Operating System's Drivers FIG. 8 is a block diagram of an exemplary system 800 that dynamically unloads a single running operating system's drivers and dynamically loads another operating system's drivers. A first operating system 815 running on a software stack 810 has associated device drivers 830 which may communicate with hardware resources 865 accessed by both the first and second operating system. A second operating system 817 running on a software stack 812 has associated device drivers 835 which also may communicate with hardware resources 865 accessed by both the first and second operating system. The device drivers 815, 817 for each operating system may be able to be dynamically loaded and unloaded by the operating system upon command. Many device drivers already support this function.

Here, we are referring to an operating system that is currently isolated from the external hardware devices as 'disabled' even though the operating system is still running. When an input is detected by a hardware device that should be processed by the operating system that does not currently have access to the hardware device (that is, is 'disabled'), the enabled operating system (the one that has access to the hardware device) dynamically unloads its device drivers, except, optionally, for a small subset of device drivers (the communication drivers, e.g., the inter-OS drivers 334 of FIG. 3) that are used to determine when the operating system should reenable itself. Software stack 810 is shown currently isolated from hardware devices; that is, though running, it can be thought of as disabled. Its memory 820 has only the communication drivers 821 loaded used to signal when it should reenable itself. Software stack 812 is shown currently enabled. Both the communication drivers 823 and other drivers 824 used to communicate with hardware 860 and shared hardware resources, e.g., the shared hardware device drivers 332 (FIG. 3) are loaded. In some embodiments, the resources that the communication drivers speak to (indicated by the dashed line in FIG. 8) are seen as not belonging to the shared hardware resources 865, but rather to the hardware resources 860. When an input is detected by the disabled operating system (e.g., using its communication drivers 821, 823) that indicates that the operating system should enable itself, the operating system dynamically loads its shared resource device drivers 830, 835. In some embodiments, the message to the second operating system to enable itself comes directly from a hardware device, e.g., the disk id detector 475 (FIG. 4).

In some embodiments, when switching hardware control from a first enabled operating system (such as OS/2 817) to a second disabled operating system (such as OS/1 815) the operating system relinquishing control instigates the enablement of the operating system gaining control; i.e., it passes the baton. In such a case an enable message 839 may be passed from a communication driver 823 associated with the operating system relinquishing control (e.g., OS/2 817) through hardware resources 860 with a corresponding message 838 passed from the hardware resources 860 to a communication driver 821 currently in memory 820 associated with the operating system gaining control, e.g., 815. The operating system 815, recall, is still running, even though currently isolated from the hardware devices, and so is able to process the message 838 passed in using the communication driver(s) 821 without further ado.

In some embodiments, when switching hardware control from a first enabled operating system (such as OS/2 817) to a second disabled operating system (such as OS/1 815) an enable message 834 is passed from a communication driver 823 directly to the disabled operating system bypassing the hardware devices that the 'disabled' operating system is isolated from. In such a case, the two systems may be connected through a separate bus used for the baton-passing communication. In some embodiments, the message may be sent using dedicated communication drivers 821, 823, that do not automatically download and load when operating system control changes. Rather, the drivers may remain loaded for the entire time that a computing device is on.

Example 9

Figure 9:
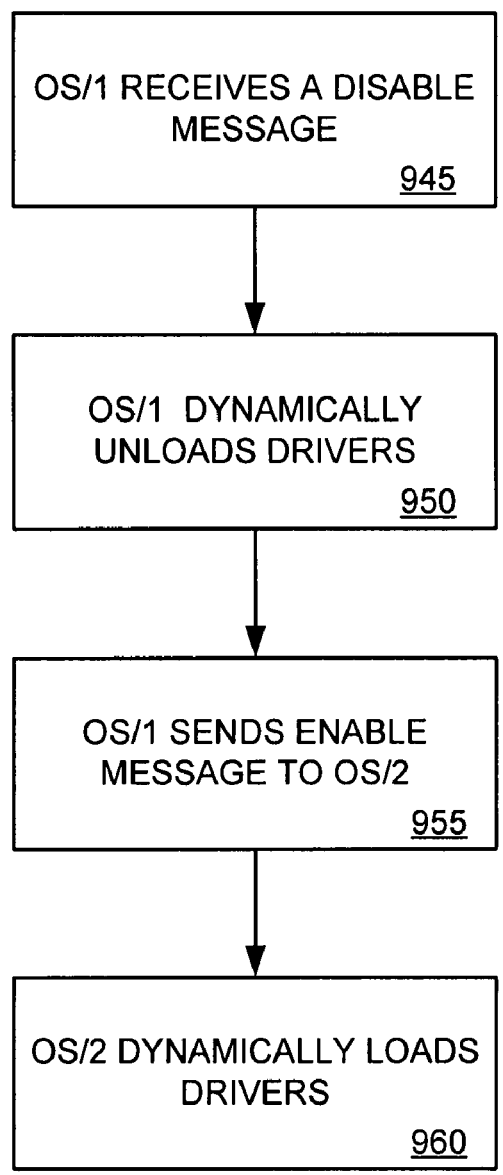
FIG. 9 is flowchart of an exemplary method for controlling the hardware of two or more simultaneously running operating systems by dynamically loading and unloading drivers as taught herein.

Exemplary Method for Controlling the Hardware of Two or More Simultaneously Running Operating Systems by Dynamically Loading and Unloading Drivers FIG. 9 is flowchart of an exemplary method 900 for controlling the hardware of two or more simultaneously running operating systems by dynamically loading and unloading drivers as taught herein. The method can be performed, for example, by the system 800 of FIG. 8.

At 945, the currently enabled operating system, OS/1, receives a disable message. This message may be sent by a firmware layer, by a hardware device, by another operating system, etc. At 950, in some embodiments, OS/1 dynamically unloads the bulk of its drivers, leaving just enough communication drivers to be able to communicate to OS2 to "pass the baton," i.e., send a message to OS/2 to enable itself, and to receive a message from OS/2 to upload its drivers. In some embodiments, more drivers are not dynamically unloaded.

At 955, using communication drivers that were not unloaded, OS/1 sends the message to OS/2 to take over control of the hardware. At 960, OS/2 dynamically loads its drivers, allowing it to control shared hardware 860 (FIG. 8) on the computing device 800 (FIG. 8).

Example 10

Exemplary Device Driver Modes

Figure 10:
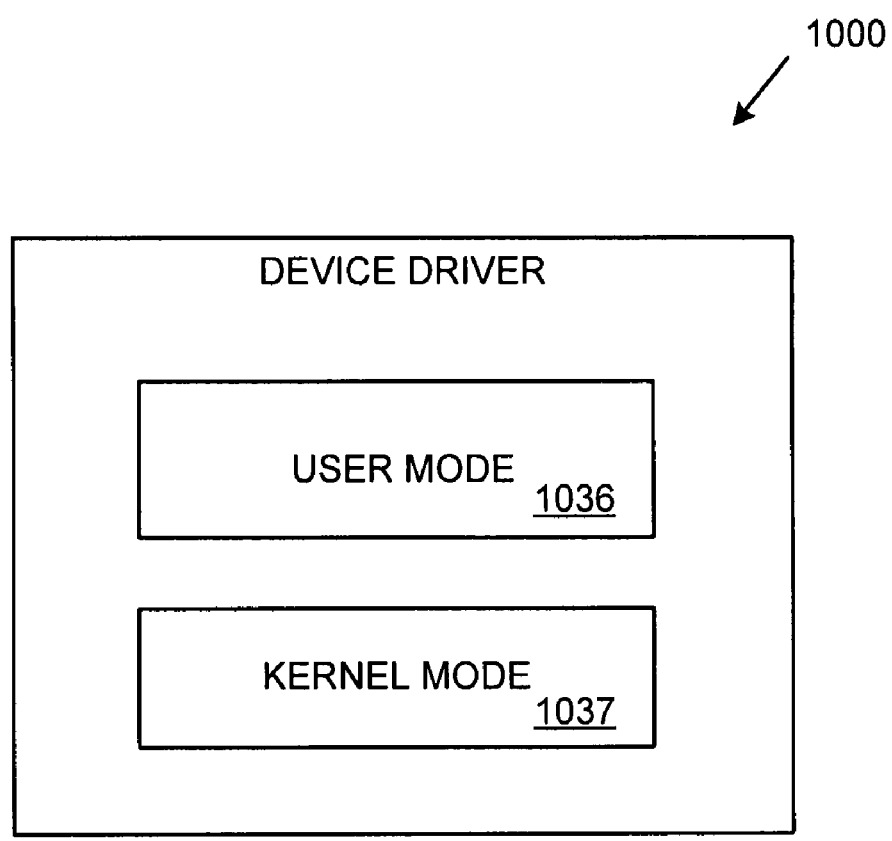
FIG. 10 is a block diagram of exemplary device driver modes.

FIG. 10 is a block diagram 1000 of exemplary device driver modes that may be used in implement passing control from one operating system to another. When an enabled operating system passes control to a currently-disabled operating system, in some embodiments, the control of this logic may be, e.g., at least partially performed by device drivers 1000 that were developed and are implemented in user mode 1036. User mode may be associated with the User-Mode Driver Framework, which itself may be associated with Microsoft Windows device driver development, such as device driver development in Windows Operating systems such as Windows Vista and Windows CE. Other user mode device drivers may be associated with different operating systems. User-mode drivers are, generally, not able to access an operating system kernel directly, but instead access the kernel through a dedicated API. When a driver error occurs, the single driver may be able to be restarted without otherwise affecting the operating system.

Alternatively, the control of the logic passing control from one operating system to another may be performed partly or totally in kernel mode 137. Drivers developed and operating in kernel mode 137 are able to access an operating system kernel explicitly, or use logic embedded in the kernel.

In some embodiments, the passing control logic may be done partly in user mode and partly in kernel mode. In other embodiments, the passing control logic may be performed in user mode for one operating system and in kernel mode for another operating system. In yet another embodiment, a different sort of control logic may be used.

Example 11

Figure 11:
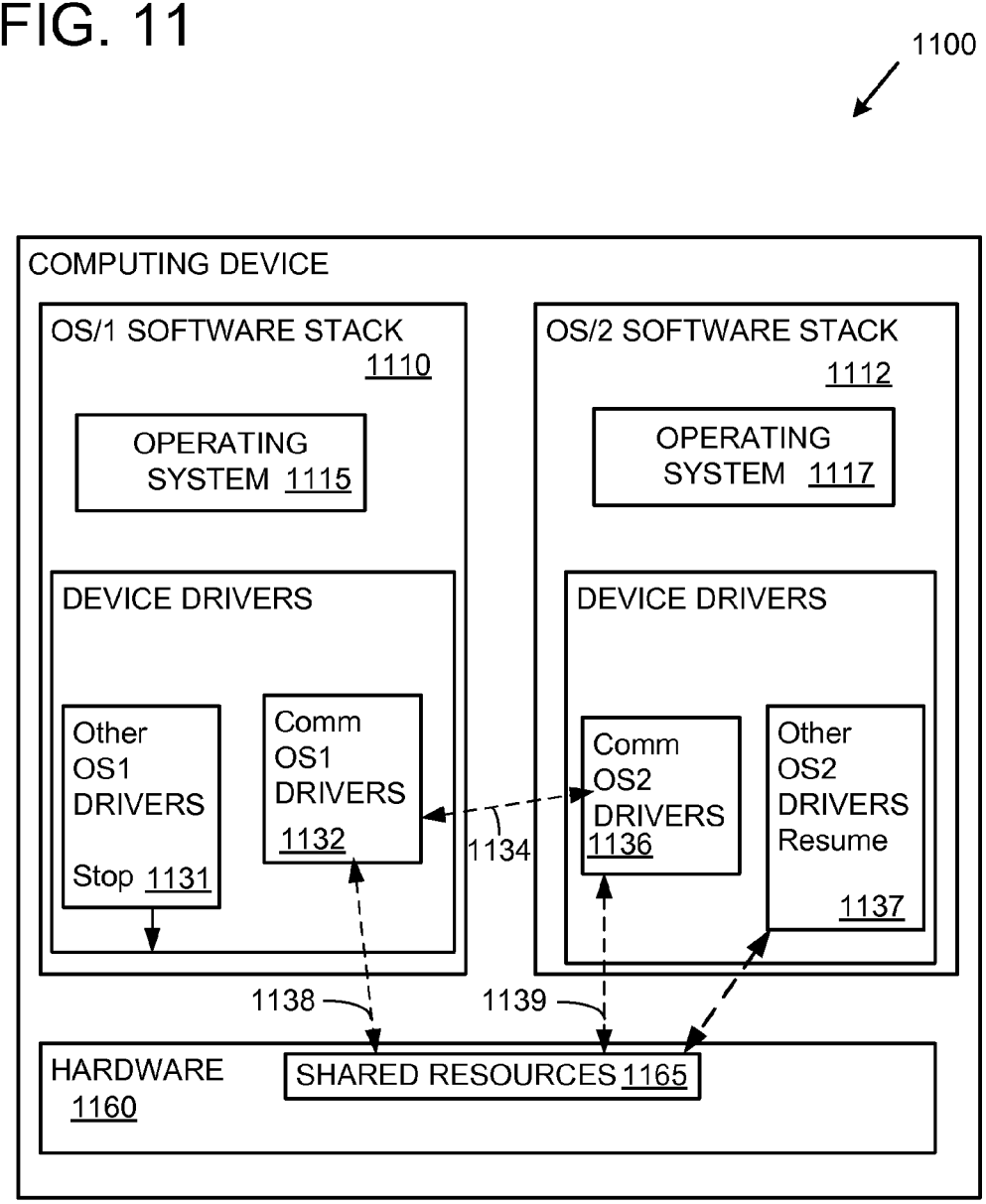
FIG. 11 is a block diagram of an exemplary system in which drivers turn themselves on and off as their associated operating system is enabled and disabled as taught herein.

Exemplary System in which Drivers Turn Themselves on and Off as their Associated Operating System is Enabled and Disabled FIG. 11 is a block diagram 1100 of an exemplary system in which drivers turn themselves on and off as their associated operating systems are enabled and disabled.

A first operating system 1115 running on a software stack 1110 has associated device drivers 1131 which may communicate with hardware resources 1165 accessed by both the first and second operating system. A second operating system 1117 running on a software stack 1112 has associated device drivers 1137, which also may communicate with shared hardware resources 1165 accessed by both the first and second operating system. Each operating system may also have device drivers 1132, 1136 used to communicate with other operating systems when control is passed between operating systems.

The device drivers 1131, 1136, that access shared resources 1165 may be written to allow the device drivers themselves to release the shared resources upon issuance of a "stop" command, and then resume contacting the shared resources upon receiving a "resume" command. In such a system, the drivers in each operating system that access shared resources—"other drivers" 1131, 1136 may be written (or modified) to support two new function controls, a "stop" control to tell the driver to stop communicating with the hardware; and a "resume" control to tell the driver to start communicating with the hardware. When a stop control message is sent to a driver, the driver will ignore other input from the operating system until a resume control is received. This way, a running operating system 1115, 1117 can be effectively cut off from controlling shared hardware resources 1165 associated with a computing device 1100, without otherwise disabling the operating system 1115, 1117. These controls may be implemented using an IO Control (IOCTL) call, a "DeviceIOControl" call, a similar call, or a combination. When a device driver relinquishes control of a device with a stop command, the device driver should leave the device in an agreed-upon state to gracefully hand-off control to the next operating system device driver.

An operating system cannot be completely cut off from the computing device world. It needs to be able, at a minimum, to receive a signal that it should enable itself, i.e., turn on its device drivers to communicate with the shared hardware resources 1165. In some embodiments, when control switches from one operating system to another, a set of drivers, the "communication drivers" 1132 1137 are not switched off when switching hardware control from a first enabled operating system (such as OS/2 1117) to a second disabled operating system (such as OS/1 1115). An enable message 1139 is passed from an operating system relinquishing control through a communication driver/drivers 1137 through hardware resources 1160. A corresponding message 1138 is passed from the hardware resources 1160 to a non-disabled communication driver 1132 to the operating system (e.g., 1115) that is gaining control. The operating system 1115, recall, is still running, even though currently disabled, and so is able to process the message 1138 passed in using the communication driver(s) 1132 without further ado.

In some embodiments, when switching hardware control from a first enabled operating system (such as OS/2 1117) to a second disabled operating system (such as OS/1 1115) an enable message 1134 is passed from the enabled operating system (e.g., OS/2 1117) directly to the disabled operating system (e.g., OS/1 1115). In such a case, the two systems may be connected through a separate bus used for the baton-passing communication. In some embodiments, the message may be sent using dedicated communication drivers 1136, 1132, that do not turn off with a "stop" command when operating system control changes. Rather, the drivers may remain on for the entire time that a computing device 1100 is on.

Example 12

Figure 12:
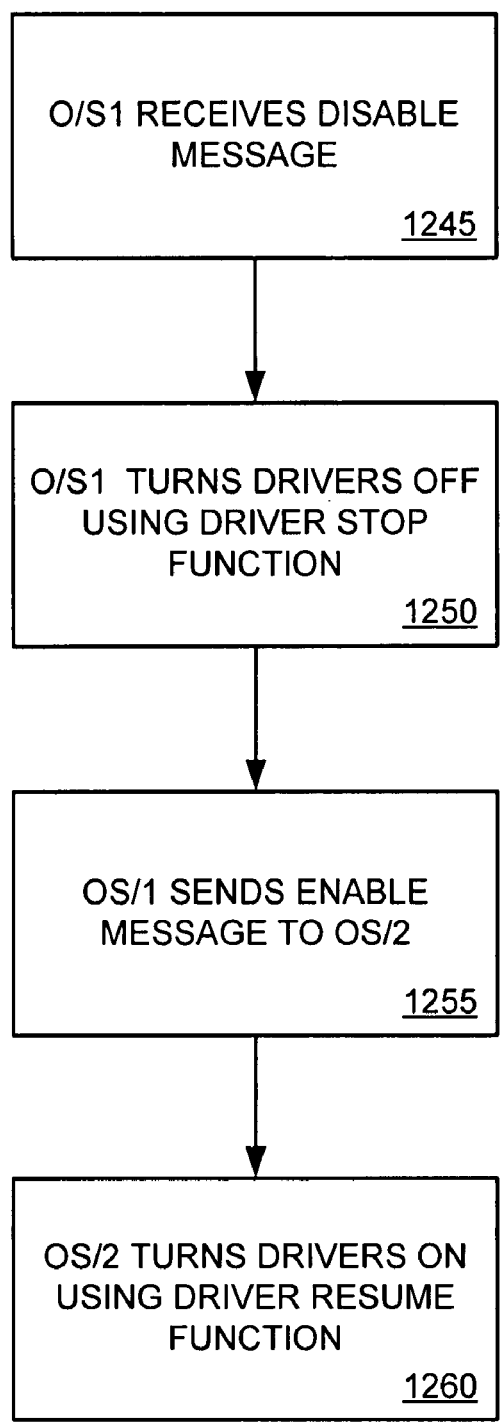
FIG. 12 is flowchart of an exemplary method for controlling the hardware of two or more simultaneously running operating systems by turning drivers on and off as taught herein.

Exemplary Method for Controlling the Hardware of Two or More Simultaneously Running Operating Systems by Turning Drivers On and Off FIG. 12 is flowchart of an exemplary method 1200 for controlling the hardware of two or more simultaneously running operating systems by turning drivers on and off. The method can be performed, for example, by the system 1100 of FIG. 11. At 1245, a first operating system that is currently enabled (e.g., its drivers are enabled such that the operating system communicates with, e.g., shared resources 1165 in FIG. 11) receives a message to disable itself. At 1250, the first operating system disables itself by sending a "stop" message to its drivers that are used to communicate with shared hardware resources, e.g., other OS2 drivers 1137 (FIG. 11). The drivers that are used to communicate with other operating systems, e.g., comm. OS2 drivers 1136, may not be turned off. In some embodiments, the drivers that are used to communicate with different operating systems, to, e.g., pass control to them, are not turned off.

At 1255, the first operating system sends a message to a second operating system to enable itself. This message may be sent with drivers that were not turned off. At 1260, the second operating system enables its drivers by sending a "resume" message to them, allowing the second operating system drivers to access the shared hardware resources (e.g., 1165 of FIG. 11.)

Example 13

Figure 13:
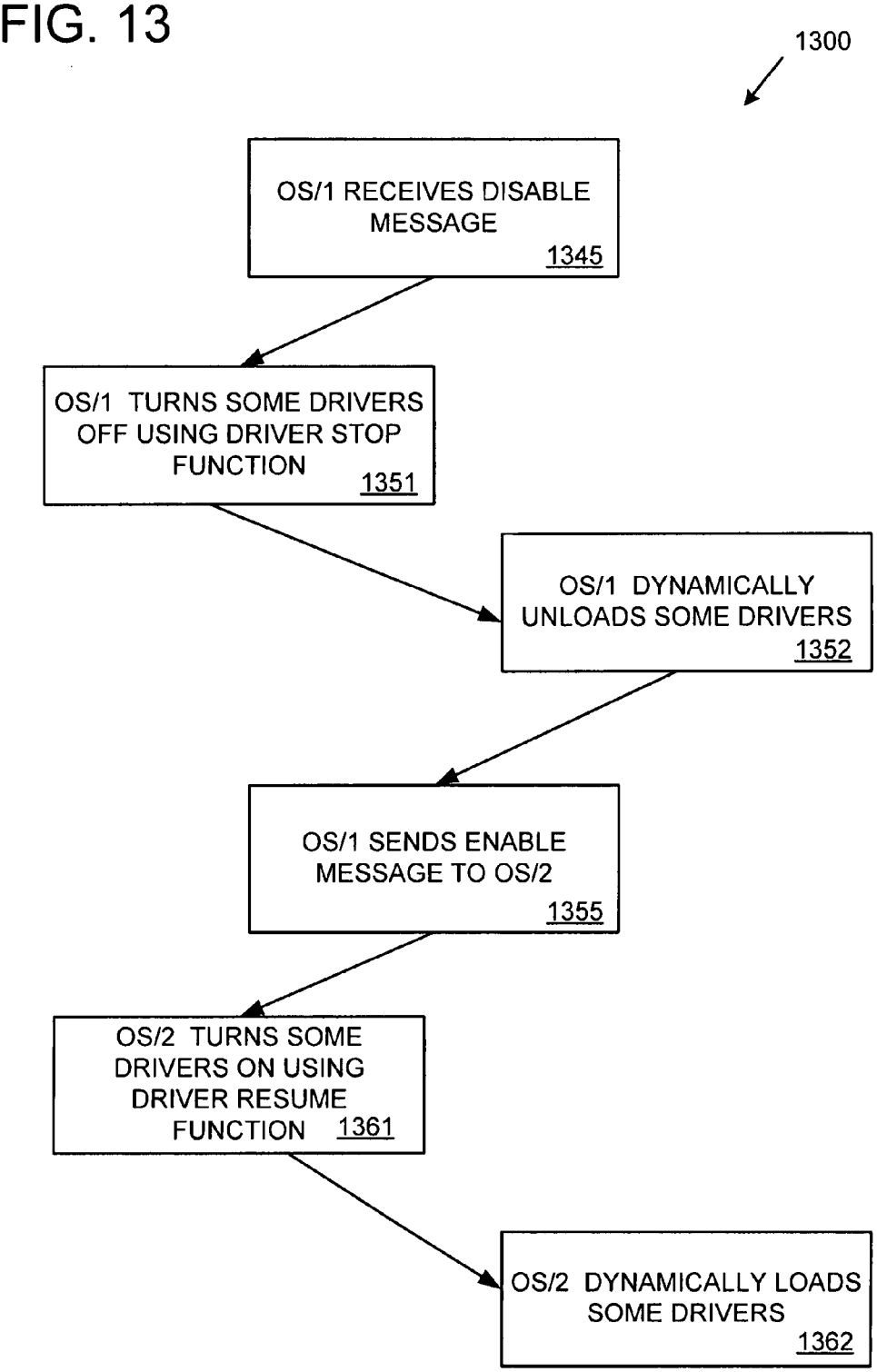
FIG. 13 is flowchart of an exemplary method for controlling the hardware of two or more simultaneously running operating systems by turning drivers on and off and by dynamically loading and unloading drivers as taught herein.

Exemplary Method for Controlling the Hardware of Two or More Simultaneously Running Operating Systems by Dynamically Loading and Unloading Drivers and by Turning Drivers On and Off FIG. 13 is flowchart of an exemplary method 1300 for controlling the hardware of two or more simultaneously running operating systems by dynamically loading and unloading some operating system drivers and by turning other operating system drivers on and off at the driver level. They method can be performed, e.g., by the system 100 of FIG. 1.

At 1345, a first operating system that is currently enabled (e.g., its drivers are enabled such that the operating system communicates with, e.g., shared resources 1165 in FIG. 11) receives a message to disable itself. At optional process block 1351, the first operating system disables a portion of its drivers so they cannot access resources shared by other running operating systems by sending a "stop" message to its drivers that are used to communicate with shared hardware resources. At optional process block 1352, the first operating system disables a portion of its drivers by dynamically unloading them.

The drivers that are used to communicate with other operating systems may not be turned off.

At 1355, the first operating system sends a message to a second operating system to enable itself. This message may be sent with drivers that were not turned off. At optional process block 1361, the second operating system enables a portion of its drivers by sending a "resume" message to them. At optional process block 1362, the second operating system enables a portion of its drivers by dynamically loading them. This allows the second operating system to access shared hardware resources (e.g., 1165 of FIG. 11.)

In another embodiment, in a computing device, one operating system associated with a software stack responds to operating system enable/disable requests through dynamically unloading and loading its drivers. In the same computing device, another operating system associated with another system stack may have device drivers that have stop and resume controls. This operating system may respond to disable/enable requests by issuing stop commands and resume commands to its device drivers, respectively.

Example 14

Figure 14:
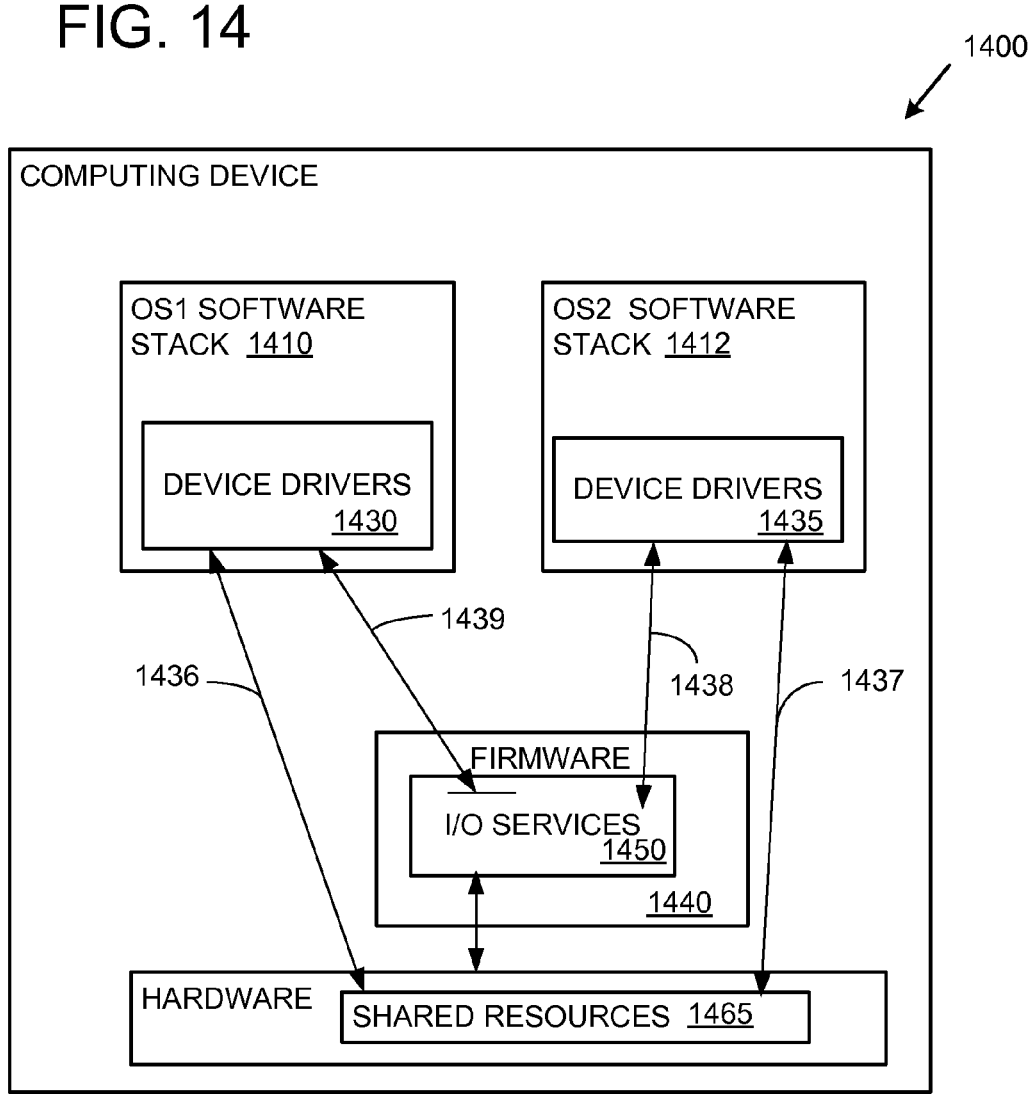
FIG. 14 is a block diagram of an exemplary system in which drivers turn themselves on and off, drivers are dynamically unloaded and loaded and drivers communicate through a firmware layer as taught herein.

Exemplary System in which Drivers Turn Themselves On and Off, Drivers are Dynamically Unloaded and Loaded and Drivers Communicate Through a Firmware Layer FIG. 14 is a block diagram of an exemplary system in which some device drivers associated with one or more operating systems on a device turn themselves on and off, some device drivers associated with one or more operating systems on the device are dynamically unloaded and loaded by their operating system and some device drivers are blocked from access or allowed access to their respective devices through a firmware layer blocking/accessing system.

A first operating system (not shown) running on a software stack 1410 has associated device drivers 1430 which may communicate with hardware resources 1465 accessed by both the first and second operating system. A second operating system running on a software stack 1412 has associated device drivers 1435 which also may communicate with hardware resources 4165 accessed by both the first and second operating system.

Some of the device drivers 1430, 1435 directly access 1436, 1437 shared resources 1465. A portion of those drivers 1430, 1465 may be written to support two new function controls, one to tell the driver to stop communicating with the hardware, a "stop" control; and one to tell the driver to start communicating with the hardware, a "resume" control. These controls may be implemented using an IO Control (IOCTL) call, a "DeviceIOControl" call, or a similar call.

A portion of the device drivers 1430, 1435 may be able to be dynamically unloaded and loaded by their associated operating system. When an input is detected that should be processed by the non-enabled operating system, the enabled operating system may dynamically unloads a portion of its device drivers 1430, 1435.

A portion of the device drivers may be turned on and off at a firmware 1440 level. Firmware 1440 may be a software program usually embedded in a hardware device. In an exemplary embodiment, the firmware 1440 is loaded when the system (e.g., the system 1400) is turned on and is unaffected by which operating system is currently enabled (e.g., has its drivers enabled to talk to the hardware). In some embodiments, the firmware may have a routine or series of routines, I/O services 1450, that allow a single point of entry for device drivers that access shared resources 1465. A portion of the device driver messages may be sent 1438, 1439 to the firmware layer 1440 rather than directly to the shared resources 1465. The firmware layer then may determine which messages to send to the shared resources 1465; e.g., the enable operating system has its messages sent on to their intended devices, while the disabled operating system(s) have their messages blocked.

Some operating systems may, when switching control, unload and load a portion of their device drivers, may have the device drivers turn themselves off and on, and may have a portion of the drivers blocked at a firmware level. The specific method that is used for an individual device driver may depend on operating system, the specific nature of the device the driver is for, the computing device that the driver device is embedded in, and so on. This way, the, e.g., fastest, or most convenient, or most easily developed method can be used for any given driver, driver grouping, or operating system.

Example 15

Figure 15:
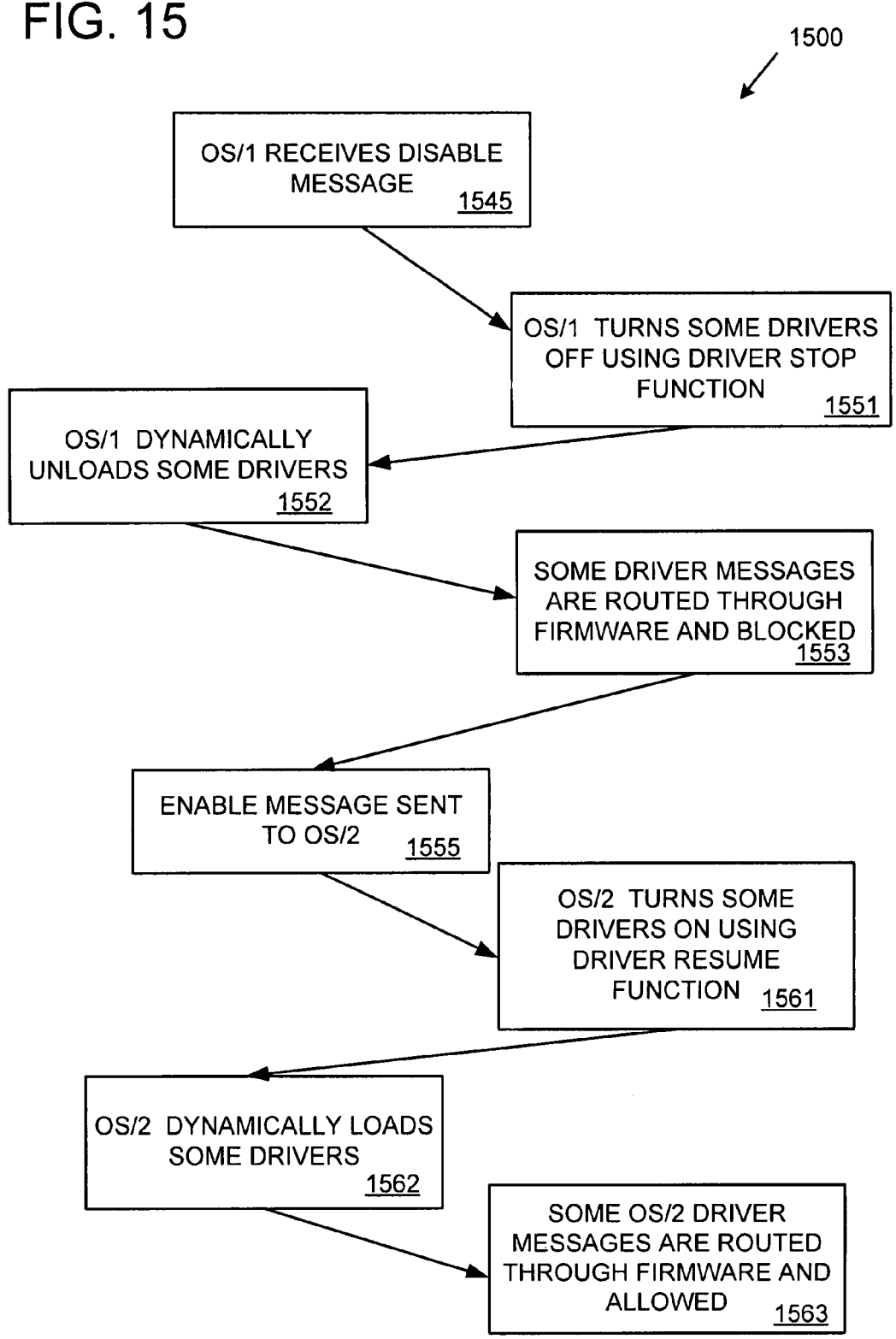
FIG. 15 is flowchart of an exemplary method for controlling the hardware of two or more simultaneously running operating systems by turning drivers on and off, dynamically uploading and downloading drivers, and ignoring drivers from a disabled operating system at a firmware layer as taught herein.

Exemplary Method for Controlling the Hardware of Two or More Simultaneously Running Operating Systems by Using a Variety of Device Driver On/Off Functions FIG. 15 is flowchart of an exemplary method 1500 for controlling the hardware of two or more simultaneously running operating systems by turning drivers on and off, dynamically uploading and downloading drivers, and ignoring drivers from a disabled operating system at a firmware layer as taught herein. The method can be performed, e.g., by the system 1400 of FIG. 14.

At 1545, a first operating system that is currently enabled (e.g., its drivers are enabled such that the operating system communicates with, e.g., shared resources 1165 in FIG. 11) receives a message to disable itself. This message may come from an enabled operating system, may come directly from a hardware device that detects an input that requests this specific operating system, or may originate elsewhere. At optional process block 1551, the first operating system disables a portion of its drivers so they cannot access resources shared by other running operating systems by sending a "stop" message to its drivers that are used to communicate with shared hardware resources. These drivers, as explained earlier, have controls that respond to a "stop" message by relinquishing control of their associated device. At optional process block 1552, the first operating system disables a portion of its drivers by dynamically unloading them. In some embodiments, the drivers that are used to communicate with different operating systems, to, e.g., receive/pass control, are not turned off.

At optional process block 1553, a portion of the first operating system's device driver messages are blocked by a firmware layer. The firmware layer may be sent a message by operating system that is currently being disabled (O/S1) to block O/S1's messages, may receive the block message directly from another hardware device, such as a disk id detector, e.g., 475 (FIG. 4) or may receive the blocking message in a different fashion.

At 1555, the first operating system that is relinquishing control sends a message to a second operating system that is gaining control telling the second operating system to enable itself. This message may be sent by the first operating system with drivers that were not turned off. In some embodiments, the message to the second operating system to enable itself comes directly from a hardware device, e.g., the disk id detector 475. At optional process block 1561, the second operating system enables a portion of its drivers by sending a "resume" message to them, allowing them to access shared hardware resources (e.g., 1165 of FIG. 11.) At optional process block 1562, the second operating system enables a portion of its drivers by dynamically loading them. This allows the second operating system to access shared hardware resources (e.g., 1165 of FIG. 11.) At optional process block 1563, a portion of the second operating system drivers are allowed through a firmware layer shared by all operating systems, e.g., the firmware layer 1440.

Example 16

Figure 16:
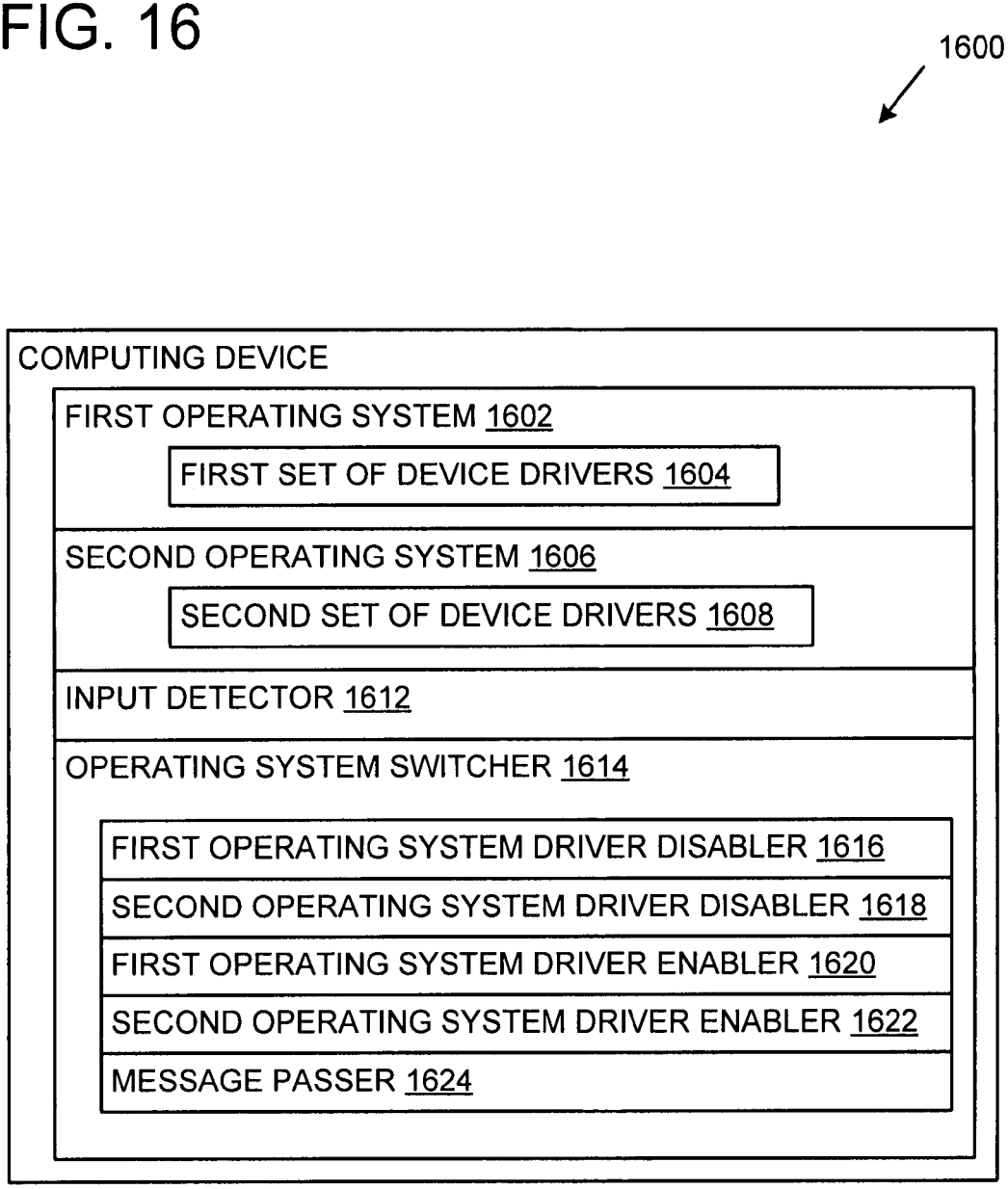
FIG. 16 is a block diagram of an exemplary system as taught herein.

Exemplary Block Diagram of a System to Allow Simultaneous Operating Systems to Run while Gracefully Handing Off Hardware Control FIG. 16 is a block diagram 1600 of an exemplary system to allow simultaneous operating systems to run on a single device, while allowing the running operating systems to gracefully hand off device hardware control between themselves. A computing device 1600 comprises a first operating system 1602 with a first set of device drivers 1604. The computing device also comprises a second operating system 1606 with a second set of device drivers 1608. The computing device may optionally include other operating systems with associated device drivers. The operating systems are associated with software stacks such that each operating system can run simultaneously within the computing device 1600.

The device drivers may be further subdivided into communication device drivers and other device drivers. Communication device drivers are used to communicate between operating systems when control is passed from one operating system to another. Other device drivers are used to communicate with hardware shared by the operating systems.

An input detector 1612 detects when an input preferably processed by a specific operating system is detected. This input may be a media format preferably read by one of the operating systems.

An operating system switcher 1614 optionally determines which operating system should handle the input and then, if necessary, disables the currently running operating system, by, i.e., removing its contacts to shared hardware resources, but otherwise leaves the operating system running on its associated software stack. The operating system switcher may comprise a message passer 1624. The message passer may pass a message from the currently enabled operating system to a currently disabled operating system telling the disabled operating system to turn itself on—e.g., enable its device drivers. This message passer may use the communication drivers of the respective operating systems, e.g., 334 of FIG. 3, or 1132, 1136 of FIG. 11.

A first operating system driver disabler 1616 and a second operating system driver disabler 1618 may also be included. The disablers 1616, 1618 may work by dynamically unloading device drivers upon receipt of a message, they may work by sending a "stop" control command to the operating system drivers not used for the message passer, they may work by blocking messages from the disabled operating system at a firmware level, or they may use a combination of the dynamically unloading, driver control stop, and firmware blocking techniques. If there are more than two operating systems, each operating system may have its own disabler. In some systems, only one disabler is provided for all running operating systems.

A first operating system driver enabler 1620 and a second operating system driver enabler 1622 may also be included. The enablers 1620, 1622 may work by dynamically loading device drivers upon receipt of a message, by sending a "resume" command to the operating system drivers not used for the message passer, by allowing messages from the enabled operating system at a firmware level, or may use a combination of the dynamically loading, driver control resume, and firmware allowance techniques. If there are more than two operating systems, each operating system may have its own enabler. In some systems, only one enabler is provided for all running operating systems.

Example 17

Figure 17:
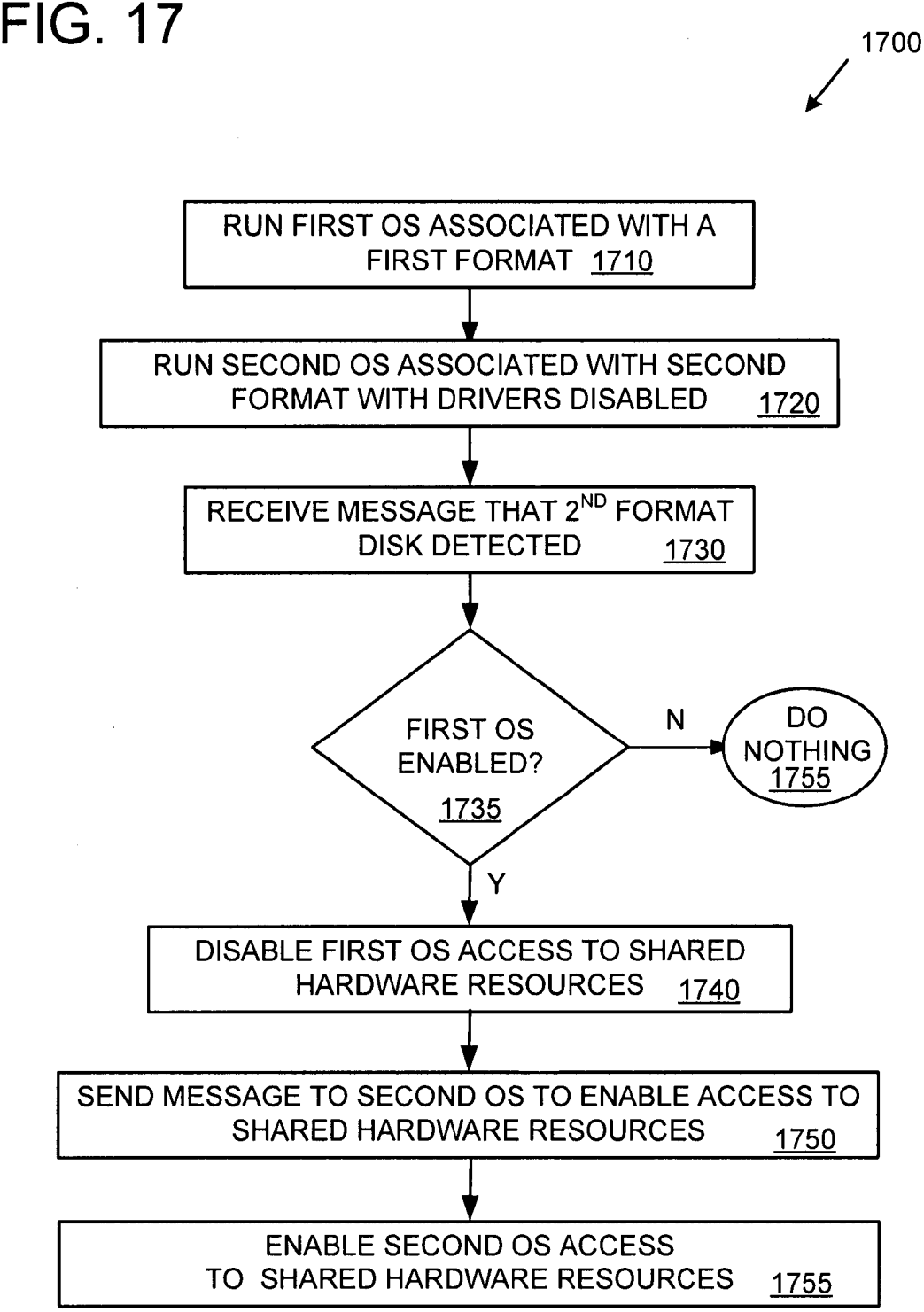
FIG. 17 is a flowchart of an exemplary method as taught herein.

Exemplary Flow Chart of a Method to Allow Simultaneous Operating Systems to Run while Gracefully Handing Off Hardware Control FIG. 17 is a flow chart 1700 of a method to allow simultaneous operating systems to run while gracefully handing off hardware control. At 1710, a first operating system is run on a computing device (e.g., the computing device 1600 of FIG. 16.) The first operating system may be associated with media in a first format, e.g., a Windows operating system may be associated with a HD DVD format disk; an Apple operating system may be associated with a disk that encodes data in a proprietary Apple format, and so on. The first operating system may be running with its drivers enabled; that is, the operating system is accepting messages from the computing device, and thus appears to be running the computing device.

At 1720, a second operating system is run simultaneously with the first operating system on the computing device. This operating system may be associated with a second format, such as a Linux system associated with a Blu-ray format optical disk, and so on. This second operating system may be running with its drivers, or at least a portion thereof, disabled. Thus, even though the second operating system is running, it is not controlling the computer device.

At 1730, a message is received that a second format disk is detected. This message may be received in a firmware layer, may be received by the first operating system using drivers that have not been disabled, or may be received in a different manner. At 1735, it is determined if the first operating system is enabled. If so, process control continues at 1740. If not, (i.e., if the second operating system is running) then the appropriate operating system is already running and so, at 1755, no action is required.

At 1740 the first operating system access to shared hardware resources is disabled. The first operating system may receive a message telling it to pass control to the second operating system. This may be done by, e.g., dynamically unloading device drivers that control hardware resources shared by multiple operating systems, by sending a "stop" command to at least a portion of the operating system drivers, e.g., those device drivers that control the shared hardware resources, by blocking messages from the disabled operating system at a firmware level, or by using a combination of the techniques. Specific device drivers used to communicate between operating systems, e.g., those that receive the message and those that will pass an enable message on to the second operating system may not be disabled.

At optional 1750, a message is sent to the second operating system to enable access to the shared hardware resources. This message may be sent by the first operating system using communication device drivers that were not disabled at 1740. At 1760, the second operating system has its drivers enabled. This may be done by, e.g., dynamically loading device drivers that control hardware resources shared by multiple operating systems, by sending a "resume" command to at least a portion of the operating system drivers, e.g., those device drivers that control the shared hardware resources, by blocking messages from the disabled operating system at a firmware level, or by using a combination of the techniques. Specific device drivers used to communicate between operating systems, e.g., those that receive the message and those that will pass an enable message on to the second operating system, may not need to be enabled, as they were not disabled.

Example 18

Exemplary Computing Environment

Figure 18:
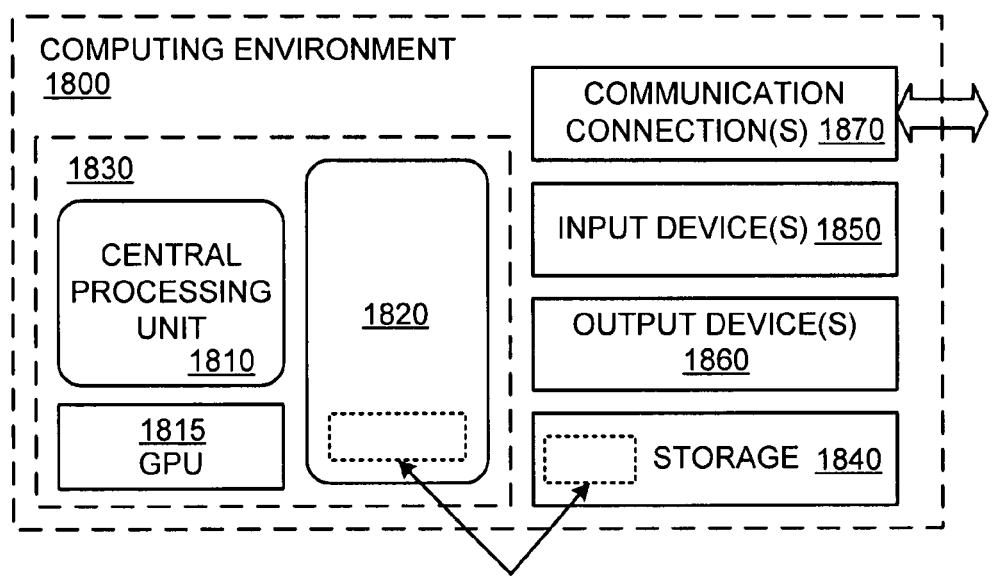
FIG. 18 is an exemplary computing environment that may be used with embodiments as taught herein.

FIG. 18 and the following discussion are intended to provide a brief, general description of an exemplary computing environment in which the disclosed technology may be implemented. The disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 18 illustrates a generalized example of a suitable computing environment 1800 in which described embodiments may be implemented. The computing environment 1800 is not intended to suggest any limitation as to scope of use or functionality of the technology, as the present technology may be implemented in diverse general-purpose or special-purpose computing environments.

With reference to FIG. 18, the computing environment 1800 includes at least one central processing unit 1810 and memory 1820. In FIG. 18, this most basic configuration 1830 is included within a dashed line. The central processing unit 1810 executes computer-executable instructions and may be a real or a virtual processor. In a multi-processing system, multiple processing units execute computer-executable instructions to increase processing power and as such, multiple processors can be running simultaneously. The computing environment 1800 may also include a graphics processing unit (GPU) 1815, which assists in creating or speeding up graphics processing and display. Memory 1820 may be volatile memory (e.g., registers, cache, RAM), non-volatile memory (e.g., ROM, EEPROM, flash memory, etc.), or some combination of the two. The memory 1820 stores software 1880 implementing the described methods for controlling hardware across two or more simultaneously running operating systems. A computing environment may have additional features. For example, the computing environment 1800 includes storage 1840, one or more input devices 1850, one or more output devices 1860, and one or more communication connections 1870. An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, High-definition DVDs, HD-DVD's, Blu-ray format optical disks, or any other medium which can be used to store information and which can be accessed within the computing environment 1800. The storage 1840 stores instructions for the software 1880 implementing methods for controlling hardware across two or more simultaneously running operating systems.

The input device(s) 1850 may be a touch input device, such as a keyboard, mouse, pen, or trackball, a voice input device, a scanning device, or another device, that provides input to the computing environment 1800. For audio, the input device(s) 1850 may be a sound card or similar device that accepts audio input in analog or digital form, a CD-ROM, DVD, HD/DVD, or Blu-ray optical disk reader that provides audio and/or video samples to the computing environment 1800. The output device(s) 1860 may be one or more of a display, printer, speaker, video screen, CD-writer, or another device that provides output from the computing environment 1800.

The communication connection(s) 1870 enable communication over a communication medium to another computing entity. The communication medium conveys information such as computer-executable instructions, compressed graphics information, or other data in a modulated data signal.

Computer-readable media are any available media that can be accessed within a computing environment 1800. By way of example, and not limitation, with the computing environment 1800, computer-readable media include memory 1820, storage 1840, communication media (not shown), and combinations of any of the above.

Example 19

Methods in Computer-Readable Media

Any of the methods described herein can be performed via one or more computer-readable media (e.g., storage media) having computer-executable instructions for performing such methods.

Example 20

Exemplary Alternatives

The technologies of any example described herein can be combined with the technologies of any one or more other examples described herein.

In view of the many possible embodiments to which the principles of the disclosed technology may be applied, it should be recognized that the illustrated embodiments are only examples of the technology and should not be taken as limiting the scope of the following claims. We, therefore, claim as our invention all that comes within the scope and spirit of these claims.

We claim:

1. A computer-enabled method for controlling hardware shared by multiple operating systems, the method comprising:

running a first operating system on a first central processing unit (CPU) associated with a computing device, the first operating system having a first set of device drivers, the first set of device drivers enabled such that they access the shared hardware, the shared hardware comprising a hardware resource;

running a second operating system on a second CPU associated with the same computing device, the second operating system having a second set of device drivers, the second set of device drivers disabled such that they do not access the shared hardware; such that the first and second operating systems run simultaneously;

detecting, by the hardware resource, an input for the second operating system; and switching operating system hardware control, comprising:
disabling the first set of device drivers, wherein at least a portion of the first set of device drivers each have a stop communication control function that stops a respective device driver of the first set of device drivers from communicating with the shared hardware; and wherein disabling the first set of device drivers comprises sending a stop message to the stop communication control function of the at least a portion of the first set of device drivers; and
enabling the second set of device drivers such that they access the shared hardware;
the second operating system using the second set of device drivers to access the input; and
the second operating system processing the input.

2. The method of claim 1 further comprising firmware, wherein the first and second set of device drivers access the firmware with messages to access associated devices; and wherein disabling the first set of drivers comprises the firmware blocking messages from the first device drivers to the associated devices.

3. The method of claim 2 wherein enabling the second set of drivers comprises the firmware sending messages from the second set of device drivers to the associated devices.

4. The method of claim 3 wherein disabling the first set of device drivers further comprises the firmware receiving messages from the associated devices to the first set of device drivers of the first operating system and sending the messages to the second set of device drivers of the second operating system.

5. The method of claim 2 in which the firmware exposes an interface that allows a single point of entry to the shared hardware for the first operating system device drivers and the second operating system device drivers.

6. The method of claim 1 wherein the first set of device drivers comprises:
A) at least one first communication device driver for passing an enable message between the first and second operating systems, and
B) a plurality of other device drivers for the shared hardware; and wherein disabling the first set of device drivers comprises the first operating system dynamically unloading the first set of other device drivers.

7. The method of claim 6 the switching operating system hardware control further comprising passing the enable message from the first operating system to the second operating system using the at least one first communication device driver.

8. The method of claim 7 wherein the second set of device drivers comprises:
1) at least one second communication device driver for passing the enable message between the first operating system and the second operating system, an
2) a plurality of other device drivers for the shared hardware; and wherein enabling the second set of device drivers comprises:
A) the second operating system receiving the enable message from the first operating system; and
B) dynamically loading the second set of other device drivers.

9. The method of claim 8 wherein the second operating system dynamically loads the second set of other device drivers.

10. The method of claim 9 wherein the second operating system dynamically loads the second set of other device drivers in user mode.

11. The method of claim 9 wherein the second operating system dynamically loads the second set of other device drivers in kernel mode.

12. The method of claim 1 wherein the first set of device drivers comprise:
A) at least one first communication device driver for passing an enable message between the first operating system and the second operating system, and
B) a plurality of other device drivers for accessing the shared hardware;
wherein the at least a portion of the first set of device drivers each have a resume communication control function that permits the respective device driver to resume communicating with the shared hardware after being stopped using the stop communication control function.

13. The method of claim 12 wherein switching operating system hardware control further comprises passing a the enable message from the first operating system to the second operating system using the at least one first communication device driver.

14. The method of claim 13 wherein at least a portion of the second set of device drivers each have a stop communication control function that stops a device driver from communicating with the shared hardware, wherein the at least a portion of the second set of device drivers each have a resume communication control function that permits the device driver to resume communicating with the shared hardware after being stopped using the stop communication control function;
and wherein enabling the second set of device drivers comprises the second operating system receiving the enable message from the first operating system, and after receipt of the enable message, the second operating system sending a resume communication message to the resume communication control function of the at least a portion of the second set of drivers.

15. A computer readable storage medium encoded with computer-executable instructions comprising software program code that cause a computing device to perform a method for controlling hardware shared by multiple operating systems, the method comprising:
running a first operating system on a first central processing unit (CPU) associated with a computing device, the first operating system having a first set of device drivers, the first set of device drivers enabled such that they access the shared hardware, the shared hardware comprising a hardware resource;
running a second operating system on a second CPU associated with the same computing device, the second operating system having a second set of device drivers, the second set of device drivers disabled such that they do not access the shared hardware; such that the first and second operating systems run simultaneously;
detecting, by the hardware resource, an input for the second operating system; and switching operating system hardware control, comprising:
disabling the first set of device drivers, wherein at least one device driver of the first set of device drivers has a stop communication control function that stops the at least one device driver of the first set of device drivers from communicating with the shared hardware; and wherein disabling the first set of device drivers comprises sending a stop message to the stop communication control function of the at least one device driver of the first set of device drivers; and
enabling the second set of device drivers such that they access the shared hardware;
the second operating system using the second set of device drivers to access the input; and
the second operating system processing the input.

16. A computing device, comprising:
at least one hardware device;
a first operating system on a first central processing unit (CPU) having a first set of device drivers operationally able to access the hardware device;
a second operating system on a second CPU having a second set of device drivers, operationally able to run simultaneously with the first operating system; the second set of device drivers operationally able to access the hardware device;
an input detector operationally able to detect an input of the hardware device;
an operating system switcher, comprising:
a first operating system driver disabler;
a first operating system driver enabler;

a second operating system driver disabler; and
a second operating system driver enabler;
wherein when the input detector detects an input associated exclusively with the second operating system, if the second operating system is disabled, the operating system switcher disables the currently enabled first operating system that is enabled to access the hardware device through use of at least the first set of communication device drivers and enables the second operating system associated with the input to have access to the hardware device through use of at least the second set of device drivers;
wherein at least one communication device driver of the first set of communication device drivers comprises a stop communication control function that stops the at least one communication device driver from communicating with the hardware device; and wherein the operating system switcher disables the currently enabled first operating system at least by sending a stop message to the stop communication control function of the at least one communication device driver of the first set of communication device drivers.

17. The computing device of claim 16 further comprising a third operating system on a third CPU having a third set of device drivers, operationally able to run simultaneously with the first and second operating system; the third set of device drivers operationally able to access the hardware device and wherein the operating system switcher, further comprises: a third operating system driver disabler; and a third operating system driver enabler.

18. A computer-implemented method to allow an optical disk drive associated with an optical disk system to play optical disks with multiple formats comprising:
on a first central processing unit (CPU), running a first operating system able to play an optical disk in the optical disk drive when the optical disk is in a first format;
on a second CPU, simultaneously running a second operating system able to play the optical disk in the optical disk drive when the optical disk is in a second format;
in response to a message that a second format disk has been detected, if the first operating system is enabled, then enabling the second operating system, comprising:
1) disabling first operating system access to shared hardware resources comprising the optical disk drive at least by disabling one or more device drivers for the first operating system that are operationally able to access the shared hardware resources comprising the optical disk drive, wherein at least one device driver of the one or more device drivers for the first operating system has a stop communication control function that stops the at least one device driver of the one or more device drivers for the first operating system from communicating with the shared hardware resources; and wherein the disabling the first operating system access to shared hardware resources further comprises sending a stop message to the stop communication control function of the at least one device driver of the one or more device drivers for the first operating system;
2) sending a message to the second operating system, and
3) enabling the second operating system access to the shared hardware resources comprising the optical disk drive at least by enabling one or more device drivers for the second operating system that are operationally able to access the shared hardware resources comprising the optical disk drive;
in response to a message that a first format disk has been detected, if the second operating system is enabled, then enabling the first operating system, comprising:
1) disabling second operating system access to shared hardware resources comprising the optical disk drive at least by disabling the one or more device drivers for the second operating system that are operationally able to access the shared hardware resources comprising the optical disk drive,
2) sending a message to the first operating system, and
3) enabling the first operating system access to the shared hardware resources comprising the optical disk drive at least by enabling the one or more device drivers for the first operating system that are operationally able to access the shared hardware resources comprising the optical disk drive; and wherein the enabled first or second operating system is used to play the optical disk in the optical disk drive.

19. The method of claim 18 wherein the first operating system further comprises drivers for accessing the shared hardware resources, at least a portion of the drivers comprising a stop communication message which stops the drivers from communicating with the shared hardware resources, and wherein disabling the first operating system access to the shared hardware resources comprises: the first operating system dynamically unloading at least a portion of the drivers and the first operating system sending a stop communication message to at least a different portion of the drivers.

* * * * *